United States Patent [19]

Yoshida et al.

[11] 4,249,243
[45] Feb. 3, 1981

[54] AUTOMATIC OPERATING SYSTEMS OF MACHINE TOOLS AND METHOD

[75] Inventors: Tetsu Yoshida; Isao Morimoto, both of Numazu, Japan

[73] Assignee: Toshiba Kikai Kabushiki Kaisha, Tokyo, Japan

[21] Appl. No.: 955,173

[22] Filed: Oct. 26, 1978

[30] Foreign Application Priority Data

Feb. 11, 1977 [JP] Japan ............................. 52/131848

[51] Int. Cl.³ ........................................... G06F 15/46
[52] U.S. Cl. .................................. 364/474; 318/569; 364/900
[58] Field of Search ............... 364/474, 107, 118, 475, 364/200 MS File, 900 MS File, 119; 414/134, 135, 136; 318/565, 569, 572; 408/6, 7; 83/71, 72, 74

[56] References Cited

U.S. PATENT DOCUMENTS

| | | | |
|---|---|---|---|
| 3,555,516 | 1/1971 | Proctor | 364/107 X |
| 3,576,540 | 4/1971 | Fair et al. | 364/200 |
| 3,753,237 | 8/1973 | Koontz et al. | 364/900 |
| 3,834,615 | 9/1974 | Watanabe et al. | 364/474 X |
| 3,866,027 | 2/1975 | Cutler et al. | 364/474 X |
| 4,150,427 | 4/1979 | Slawson | 364/474 X |

*Primary Examiner*—Joseph F. Ruggiero
*Attorney, Agent, or Firm*—Koda and Androlia

[57] ABSTRACT

While machining a workpiece with a tool of a machine tool according to a numerically controlled machining program, when the tool breaks, the workpiece is removed from the machine tool and a new workpiece is substituted. A new program for the new workpiece is selected and a new tool for machining the new workpiece is selected and substituted for the broken tool. Now the new workpiece is machined in accordance with a new program. The workpieces removed from the machine tool are collected, fragments of the broken tools are removed therefrom, and then machined again. A tool magazine containing a plurality of tools is provided. Broken tools are removed from the machine tool and returned to the tool magazine. When all tools in the tool magazine are judged to be broken, new tools of the same type are supplemented. When the tools are worn out similar steps are executed.

15 Claims, 32 Drawing Figures

FIG. 8

| TOOL NUMBER | 8BITS iNETNN | 1 FTCNN | 5 FCOiMNN | 1 FTBNN | 1 FTWNN |
|---|---|---|---|---|---|
| 00 | | | | | |
| 01 | 00000000 | 0 | 00001 | 0 | 0 |
| 02 | 00000000 | 0 | 00001 | 0 | 0 |
| 03 | 00000000 | 0 | 00001 | 0 | 0 |
| 04 | 00000000 | 0 | 00001 | 0 | 0 |
| 00 | | | | | |
| 05 | 01011001 | 1 | 00010 | 0 | 1 |
| 06 | 01011001 | 1 | 00010 | 1 | 1 |
| 00 | | | | | |
| 07 | 00000000 | 0 | 00011 | 0 | 0 |
| 08 | 00000000 | 0 | 00011 | 0 | 0 |
| 00 | | | | | |
| 09 | 10010001 | 1 | 00100 | 0 | 0 |
| 00 | | | | | |
| ⁝ | | | | | |
| NN | | | j | 0 | 1 |
| ⁝ | | | | | |
| 99 | | | 11111 | 1 | 1 |
| 00 | | | | | |

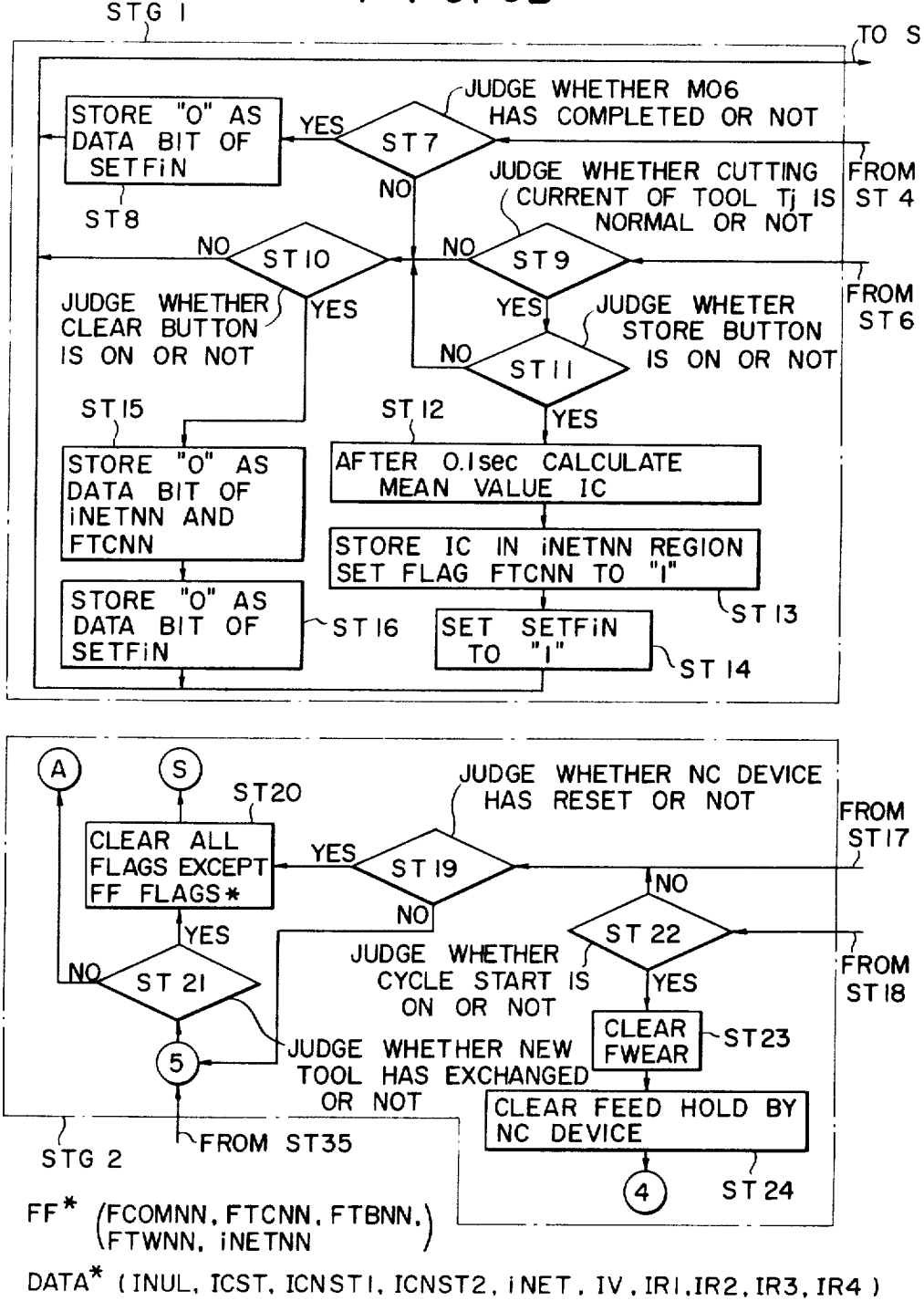

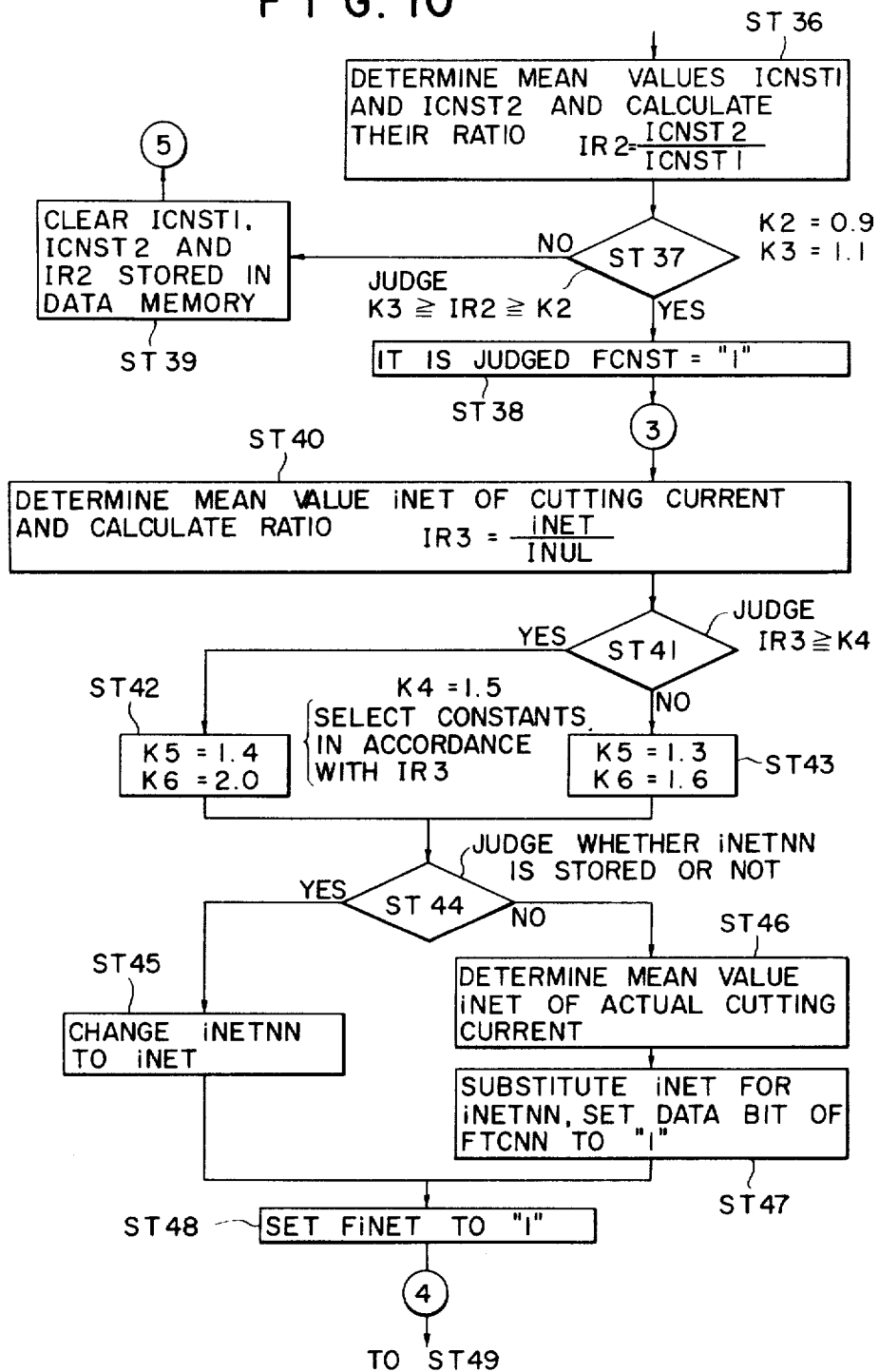

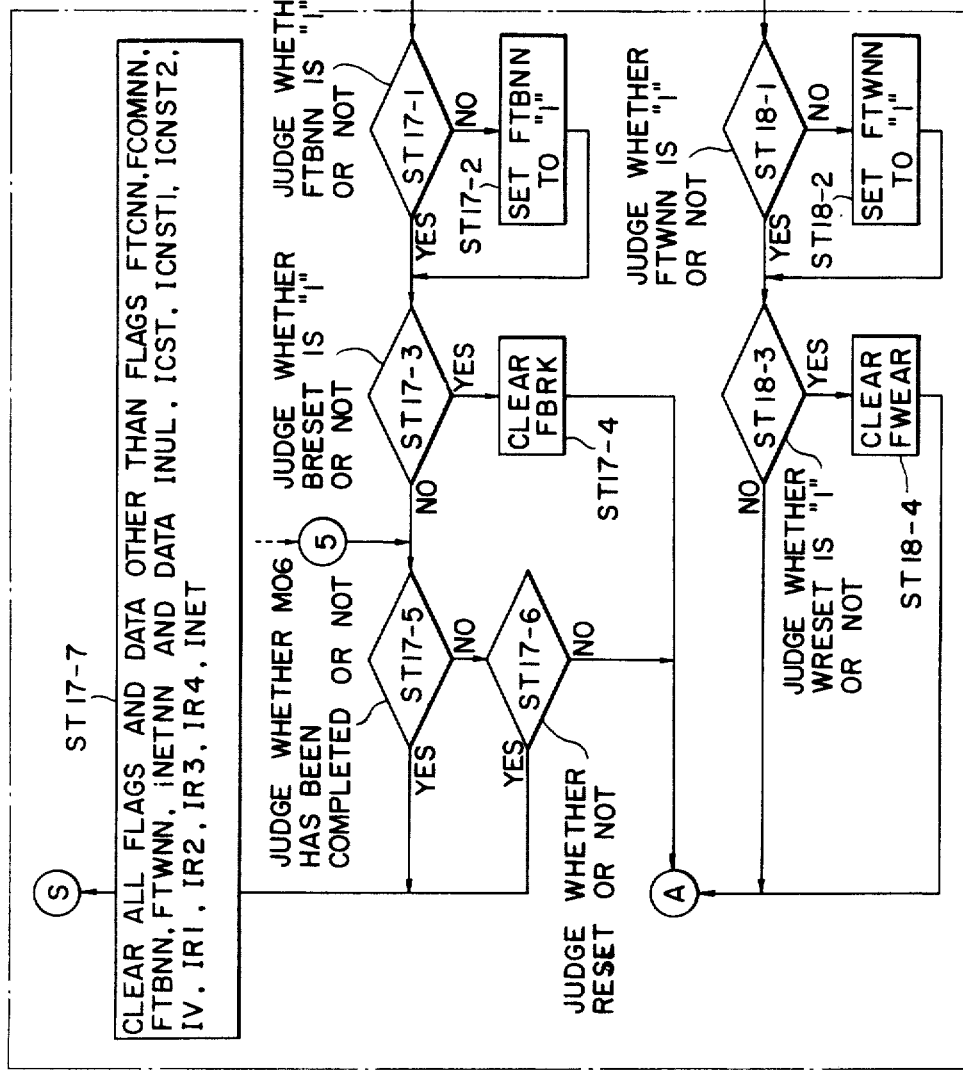

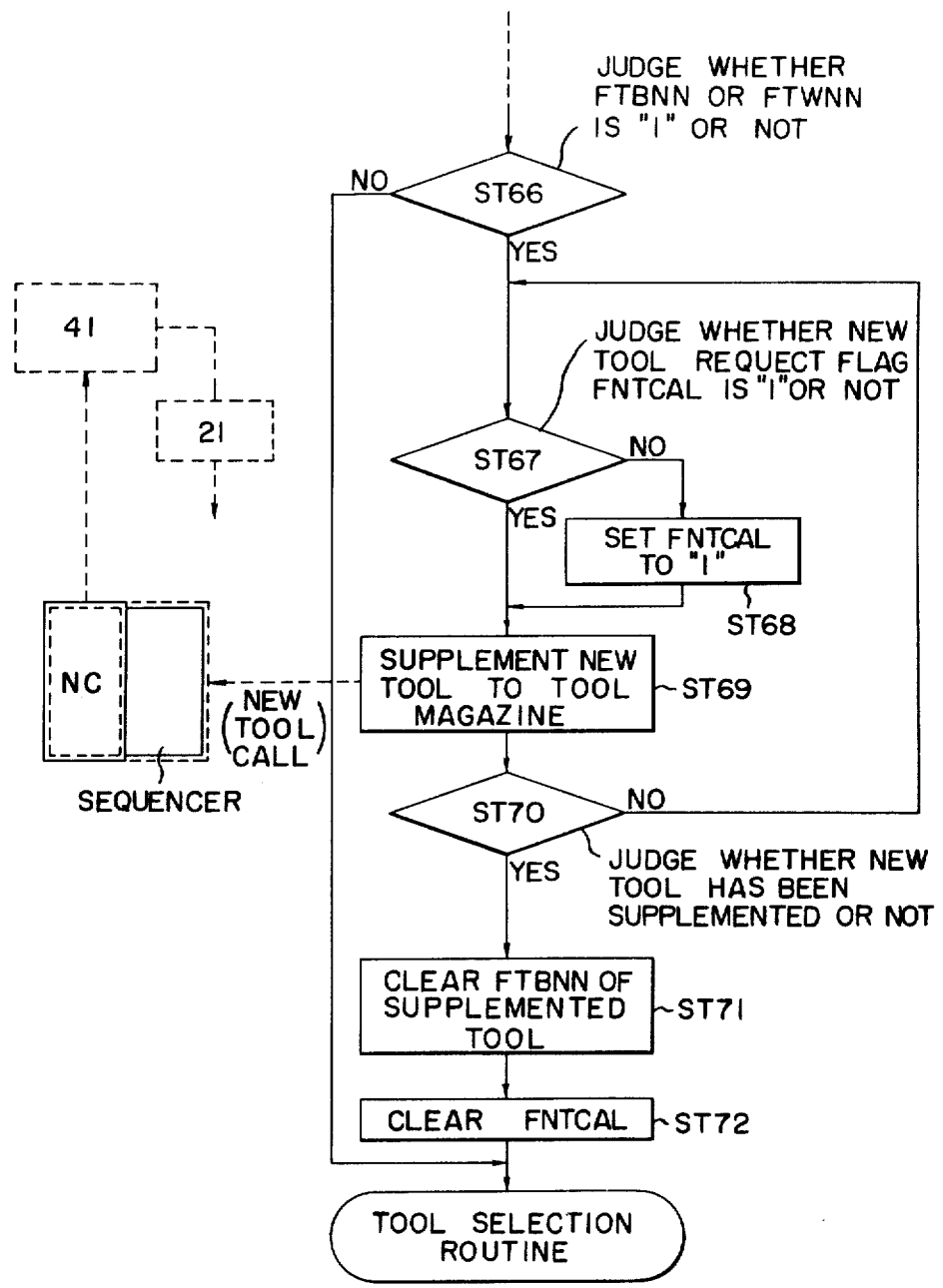

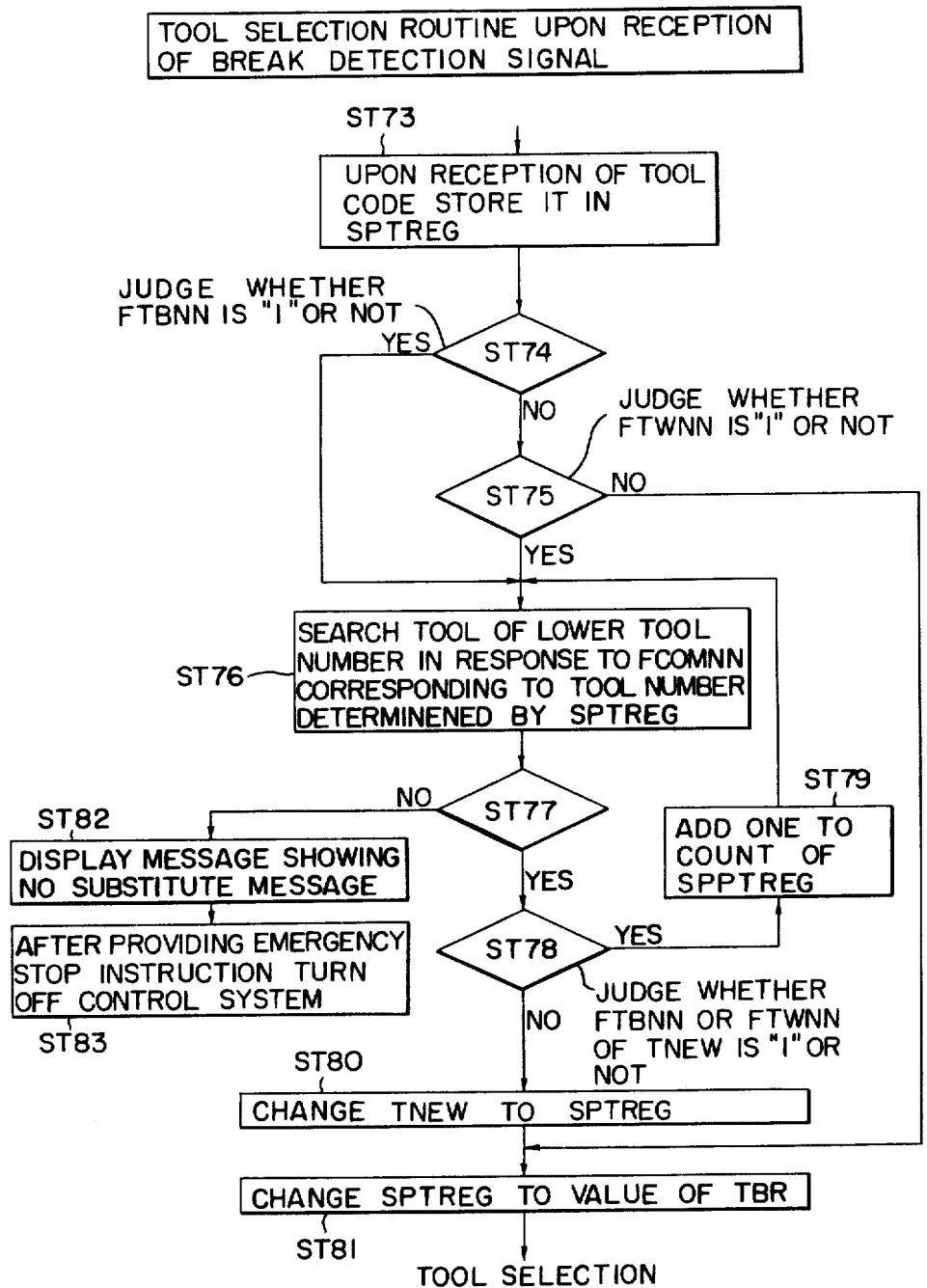

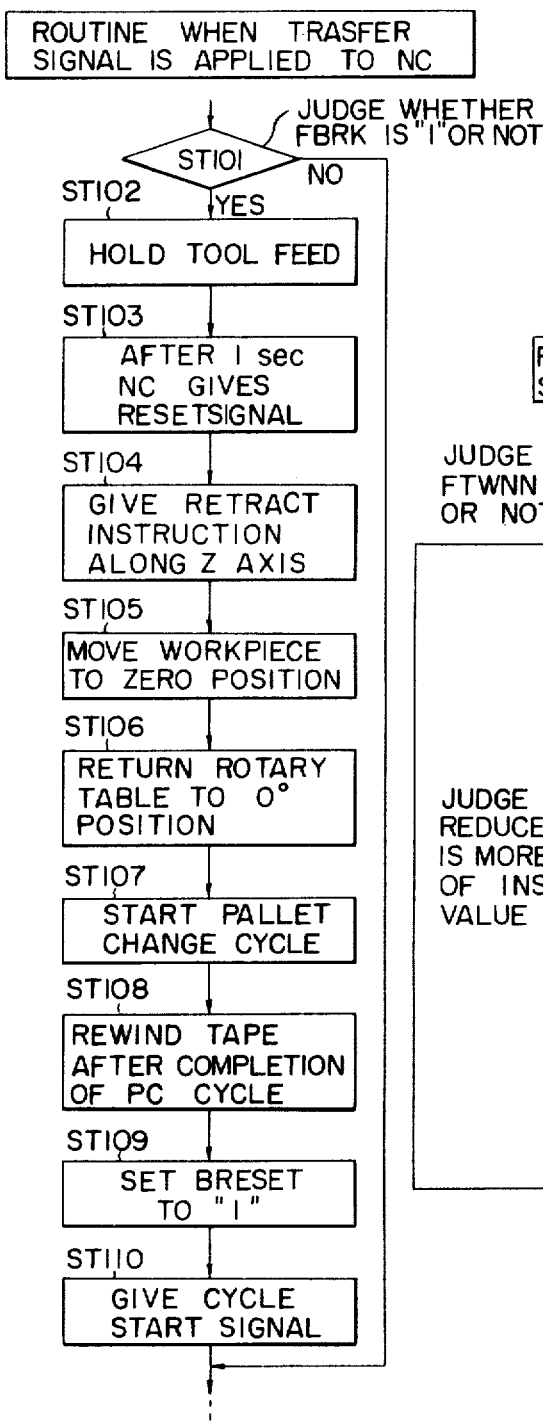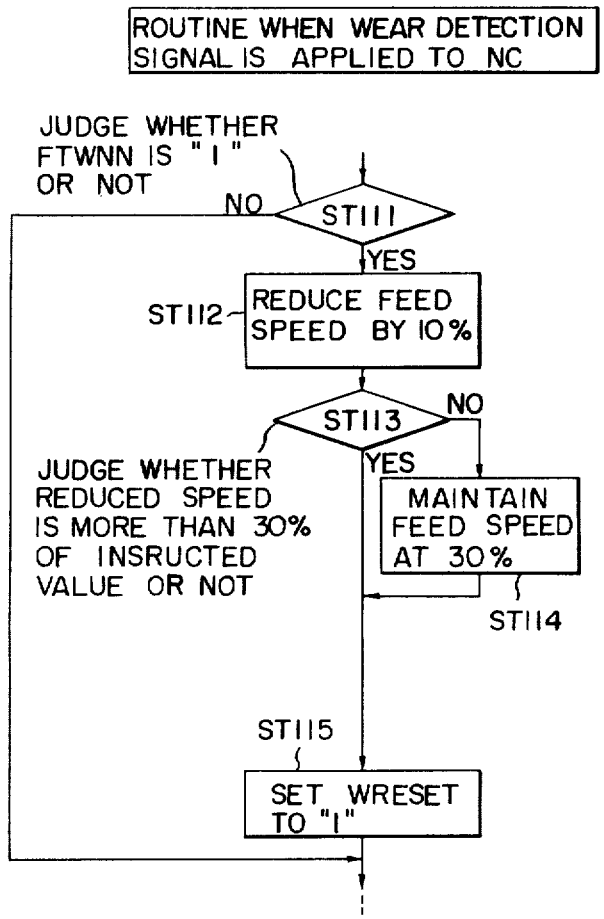

FIG. 18
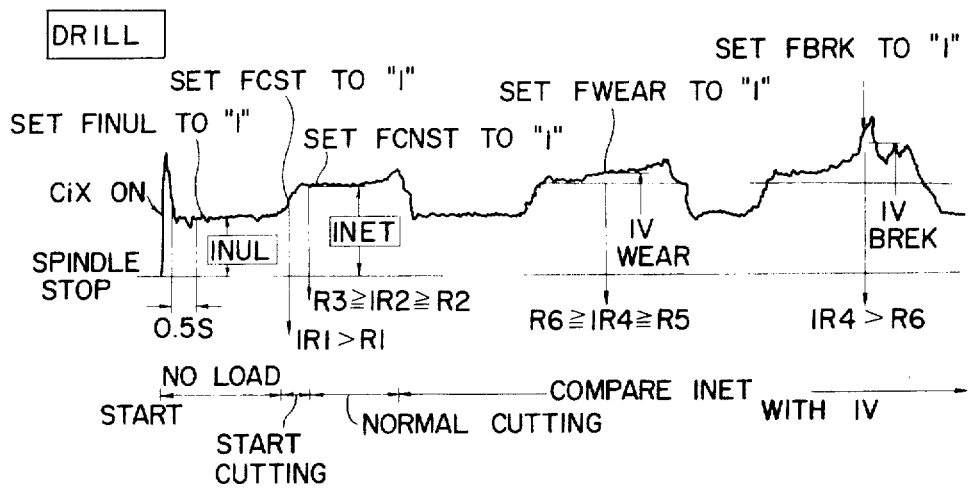
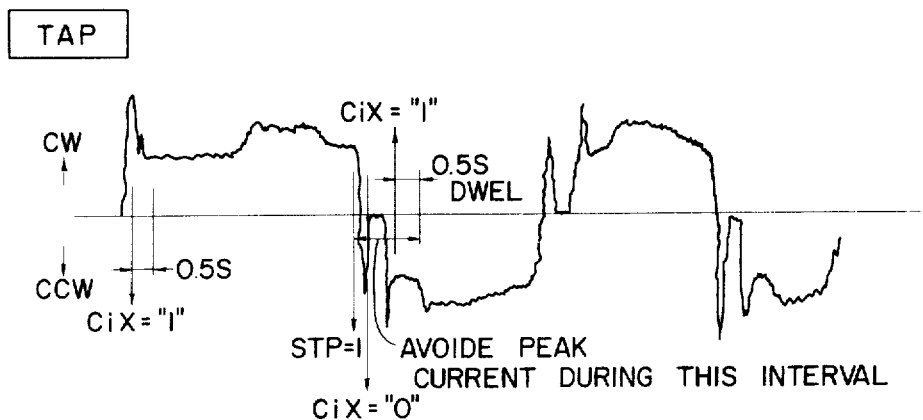
REMARK)
STP = (M05)+(M34*M18)+(M35*M17)+SRV+SSP
PREVENT SAMPLING OF CURRENT AT START AND STOP OF SPINDLE

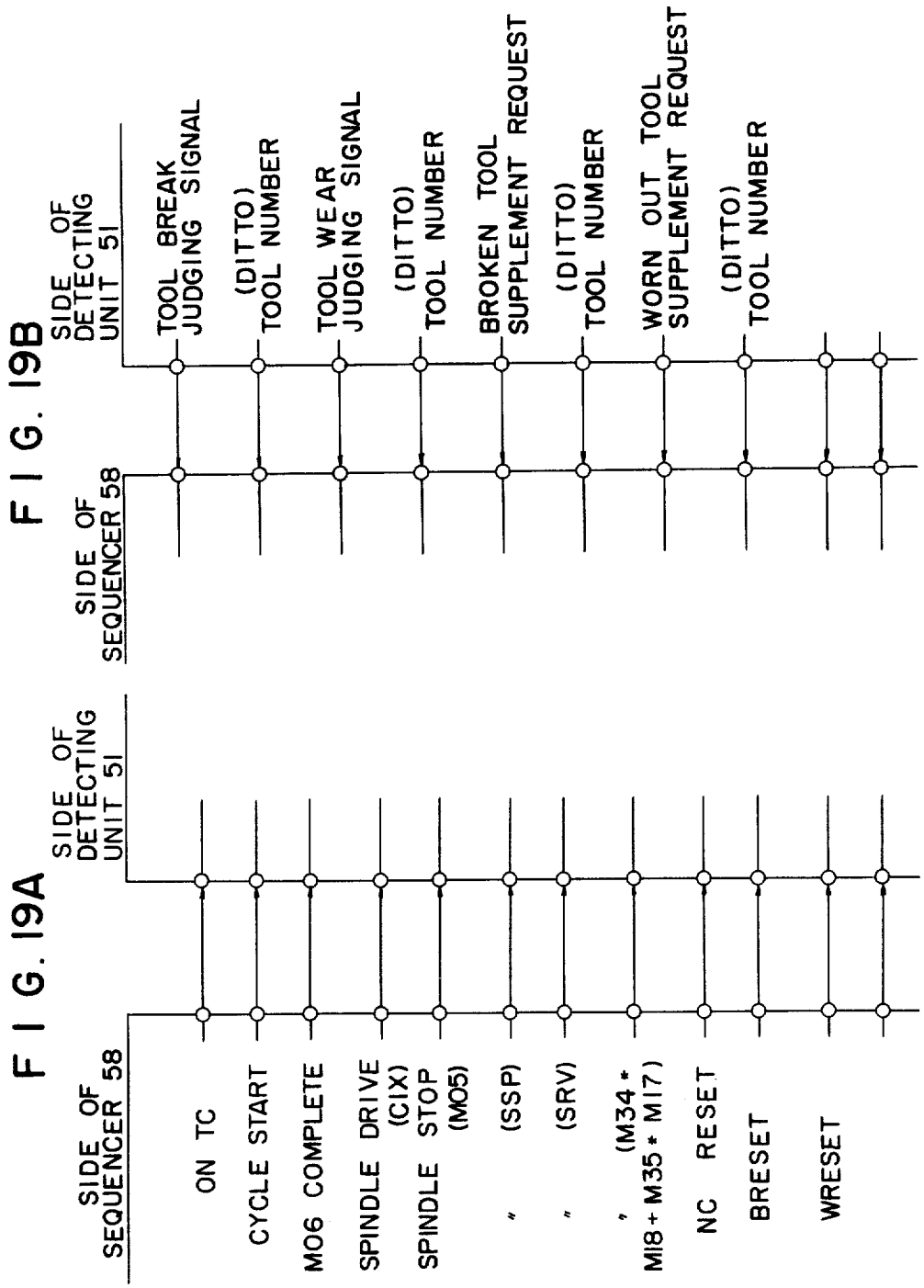

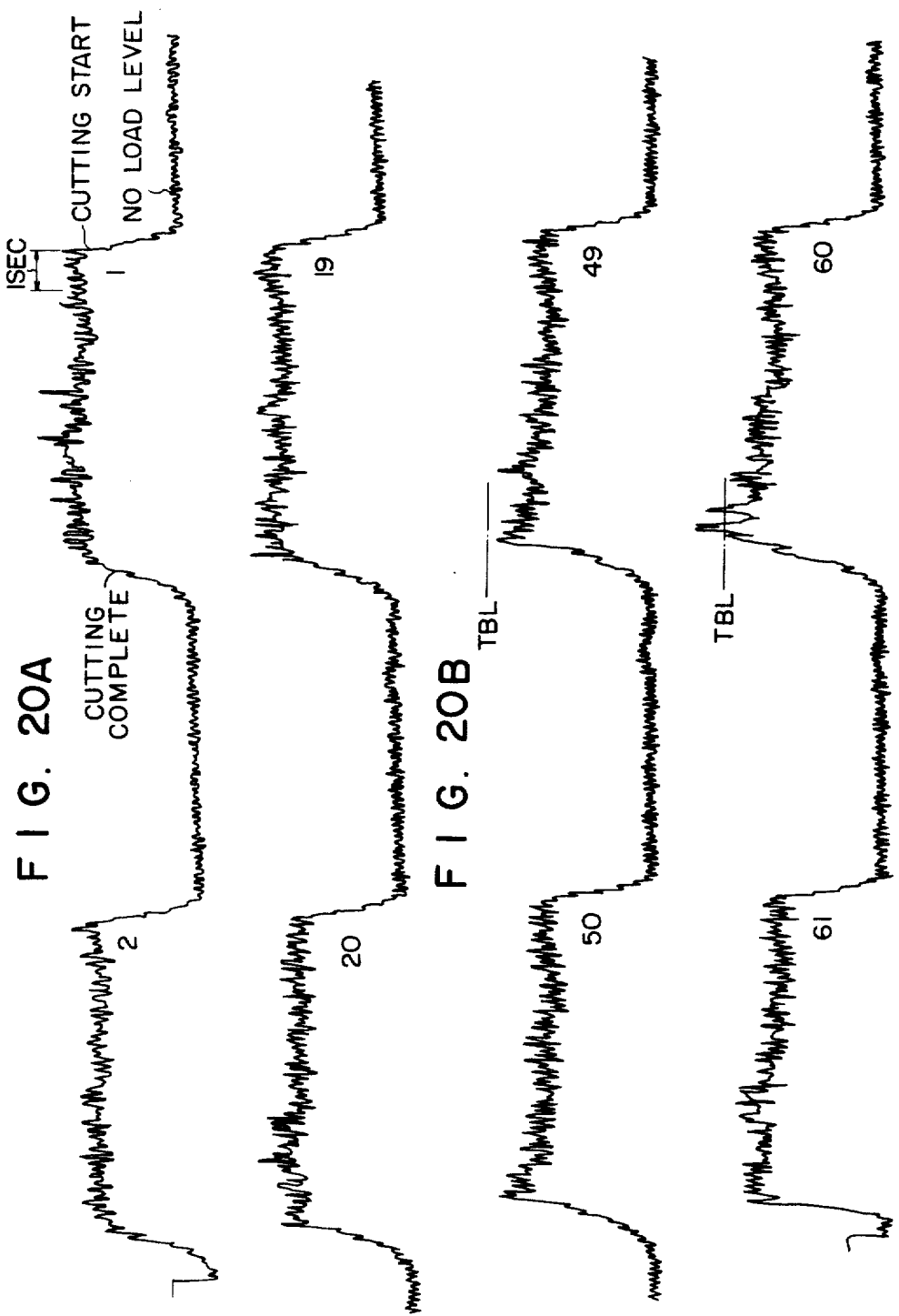

F I G. 21A
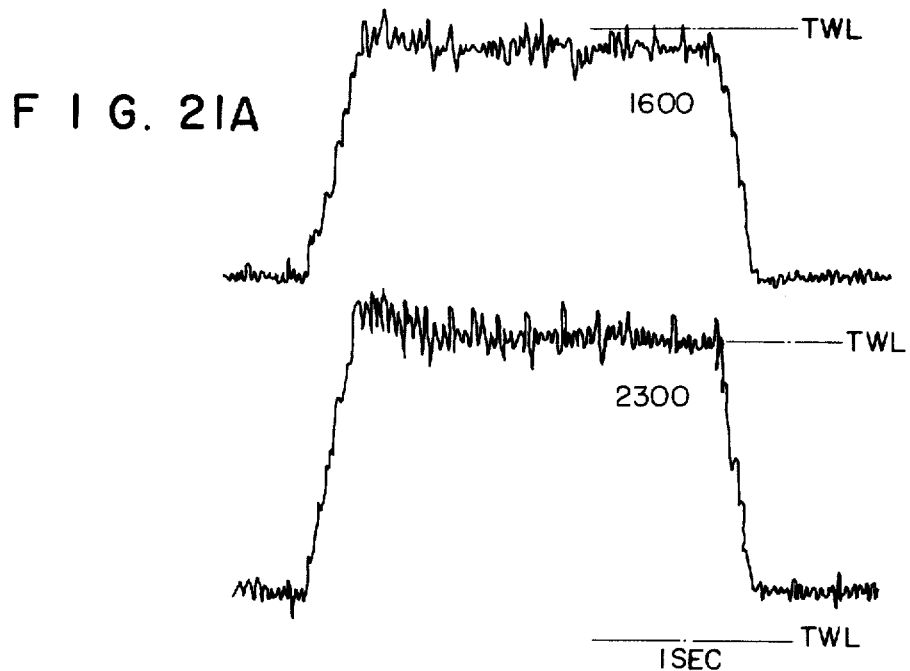
F I G. 21B
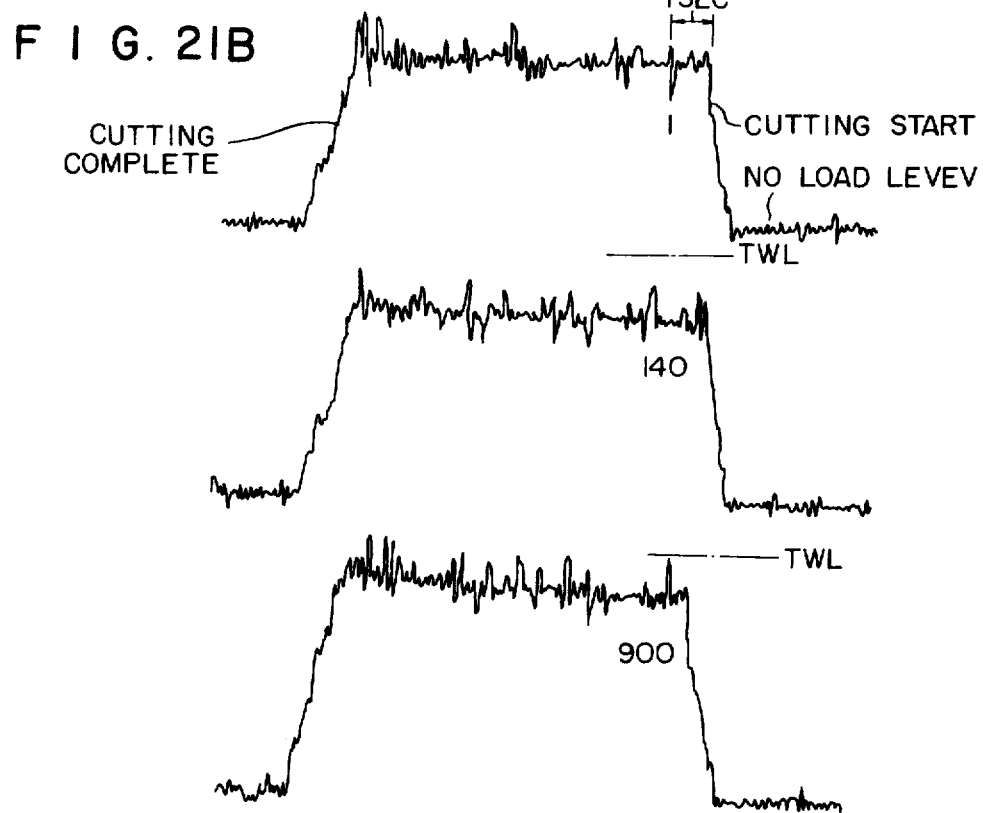

AUTOMATIC OPERATING SYSTEMS OF MACHINE TOOLS AND METHOD

BACKGROUND OF THE INVENTION

This invention relates to an automatic operating system of a machine tool and method, more particularly to a system and method of operation for exchanging a tool and a workpiece worked thereby when the tool breaks or wears.

In an automatic operating system of a machine tool wherein a plurality of different workpieces are machined sequentially over a long time by using machine tools including a plurality of machining centers, there are many problems to be solved including (a) handling of the chips,
(b) detection of the presence or absence of a workpiece to be supplied, that is the detection of a pallet which carries the last workpiece and deenergization of the system,
(c) detection of the abnormal cutting of each machine tool and the operation of the control system after the detection, and
(d) administration of the cutting agent.

Among these problems, (c) is the most important for performing an automatic operation. When abnormal cutting occurs various expedients have been used for the purpose of preventing the shut down of the entire system or a specific machine tool in which abnormal cutting is detected.

Suppose now that while a machining center (MC) is machining an opening through a workpiece for tapping, a drill for machining the opening breaks. Even when the breakage is detected by some detecting means, continued machining of the opening by a new drill is not possible because fragments of the broken drill remain in the opening. In such a case, it is not simple to automatically check whether the fragments of the drill remain in the opening or not and to remove the remaining fragments.

According to another proposed method, the drilling operation is interrupted and the workpiece is advanced to another working position without completing the drilling operation. Where a plurality of openings for tapping are to be formed by the same drill, it is usual to sequentially form the openings and then successively form screw threads with a tap. Accordingly, when a drill breaks while it is being used to form an opening for tapping at a given position $(X_j, Y_j, Z_j)$, a new identical drill is used to sequentially form openings at other working positions, and then screw threads are formed by using a tap, it is necessary to avoid to use the tap at said position $(X_j, Y_j, Z_j)$. More particularly, while a working program is being executed, when an accidental fault, for example breakage of a tool $T_1$ occurs at a working position $(X_j, Y_j, Z_j)$, to instruct that the working by a different tool $T_2$ at the same position should be eliminated while executing a subsequent working program, and to store said working position complicates the construction and operation of the control system.

Where K working steps are required to machine a workpiece at a given position $(X_j, Y_j, Z_j)$, when the fault occurs in the first working step it is necessary to modify an NC (numerically controlled) program so as to omit remaining (K-1) working steps at that position, thus complicating the NC system. Such modified control is based on the desire that even when a portion of the working step is not performed it is desirous to perform as far as possible the remaining steps.

SUMMARY OF THE INVENTION

It is an object of this invention to provide an improved system and method of automatic operation of a machine tool capable of eliminating the difficulties of the prior art system described above.

Briefly stated, according to this invention when a tool, for example a drill, breaks, the machining of a workpiece by the tool is interrupted and the workpiece is exchanged with a new workpiece. At the same time a new program is selected for machining the new workpiece and the broken tool is exchanged with a new tool suitable for machining the new workpiece. Then the new workpiece is machined with the new tool. Workpieces which have worked by tools until they are judged to be broken are collected at a predetermined position and after removal of the fragments of the tools remaining in the workpieces they are subjected to remaining machining steps. According to this invention, the term "break" not only means actual breakage but also a state immediately before breakage since abnormal increase in the armature current of a motor for driving the tool or increase in the thrust acting upon the tool is used for the judgement. Where wear occurs similar procedures are executed.

According to one aspect of this invention, there is provided an automatic operating system of a machine tool havng a spindle on which a tool is mounted for machining a workpiece mounted on a machining area of the machine tool in accordance with a numerically controlled machining program, said system comprising tool storage means containing a plurality of tools for use on the machine tool; means for detecting a broken state of a tool while it is mounted on the machine tool and machining the workpiece; memory means including first and second memory areas corresponding to the tools contained in the tool storage means for respectively storing a first data which is referred to for judging the broken state of the tool on the machine tool, and a second data representing that the tool has been judged to be broken in accordance with the first data; means for detecting a third data and storing the same in the second memory area, the third data being compared with the first data during actual cutting operation of the workpiece with the tool mounted on the machine tool; means to read out the first and third data from the first and second memory areas respectively and to compare the read out data with each other for judging the broken state of the tool; means for storing the second data in the second memory area of the memory means when the tool is judged to be broken; means responsive to the judgement of the broken state of the tool for interrupting the machining of the tool; means for moving the spindle relative to the workpiece to separate the tool therefrom; means for removing the workpiece out the machining area; means for mounting a new workpiece on the machining area; means for selecting a new machining program for said new workpiece; means for selecting a new tool out of said tool storage means and for exchanging said new tool with said tool judged to be broken; and means for machining said new workpieces with said new tool.

According to another aspect of this invention there is provided a method of automatic operation of a machine tool having a spindle on which a tool is mounted for machining a workpiece mounted on a machining area of the machine tool in accordance with a numerically controlled machining program, said machine tool being combined with tool storage means containing a plurality of tools for use on the machine tool, and memory means including first and second memory areas corresponding to the tools contained in the tool storage means, said method comprising the steps of storing a first data which is referred to for judging the broken state of the tool on the machine tool and a second data representing that the tool has been judged to be broken in accordance with the first data in the first and second memory area respectively; detecting a third data which is compared with the first data during actual cutting operation of the workpiece with the tool mounted on the machine tool; storing the third data in the second memory area; reading out the first and third data from the first and second memory areas respectively and to compare the read out data with each other for judging the broken state of the tool; storing the second data in the second memory area when the tool is judged to be broken; interrupting the machining of the workpiece by the tool when it is judged to be broken; moving the spindle relative to the workpiece to separate the tool therefrom; removing the workpiece out of the machining area; mounting a new workpiece on the machining area; selecting a new machining program for the new workpiece; selecting a new tool out of the storage means and exchanging the new tool with the tool judged to be broken and machining the new workpiece with the new tool.

BRIEF DESCRIPTION OF THE DRAWINGS

In the accompanying drawings

FIG. 8 is a table showing the content of a memory device utilized in the detecting unit;

FIGS. 9A, 9B, and FIGS. 10 and 11 are flow charts showing the program steps for judging the break and wear of a tool according to this invention;

FIG. 12 is a flow chart showing a modification of the tool group STG2 shown in FIG. 9A;

FIG. 13 is a flow chart showing the steps of giving a tool supplement instruction;

FIGS. 14, 15, and 16 are flow charts showing the operation of an NC device when a tool is judged to be broken and worn out;

FIG. 18 shows signal waveforms when a drill and a tap are used for working;

FIGS. 19A and 19B show interfaces between a detecting unit and a sequencer;

FIGS. 20A and 20B show the current waveforms of the spindle driving motor where a drill having a diameter of 6 mm is used to form an opening;

FIGS. 21A and 21B show the current waveforms of the spindle driving motor where a drill having a diameter of 6 mm is used;

DESCRIPTION OF THE PREFERRED EMBODIMENT

Figure 1:
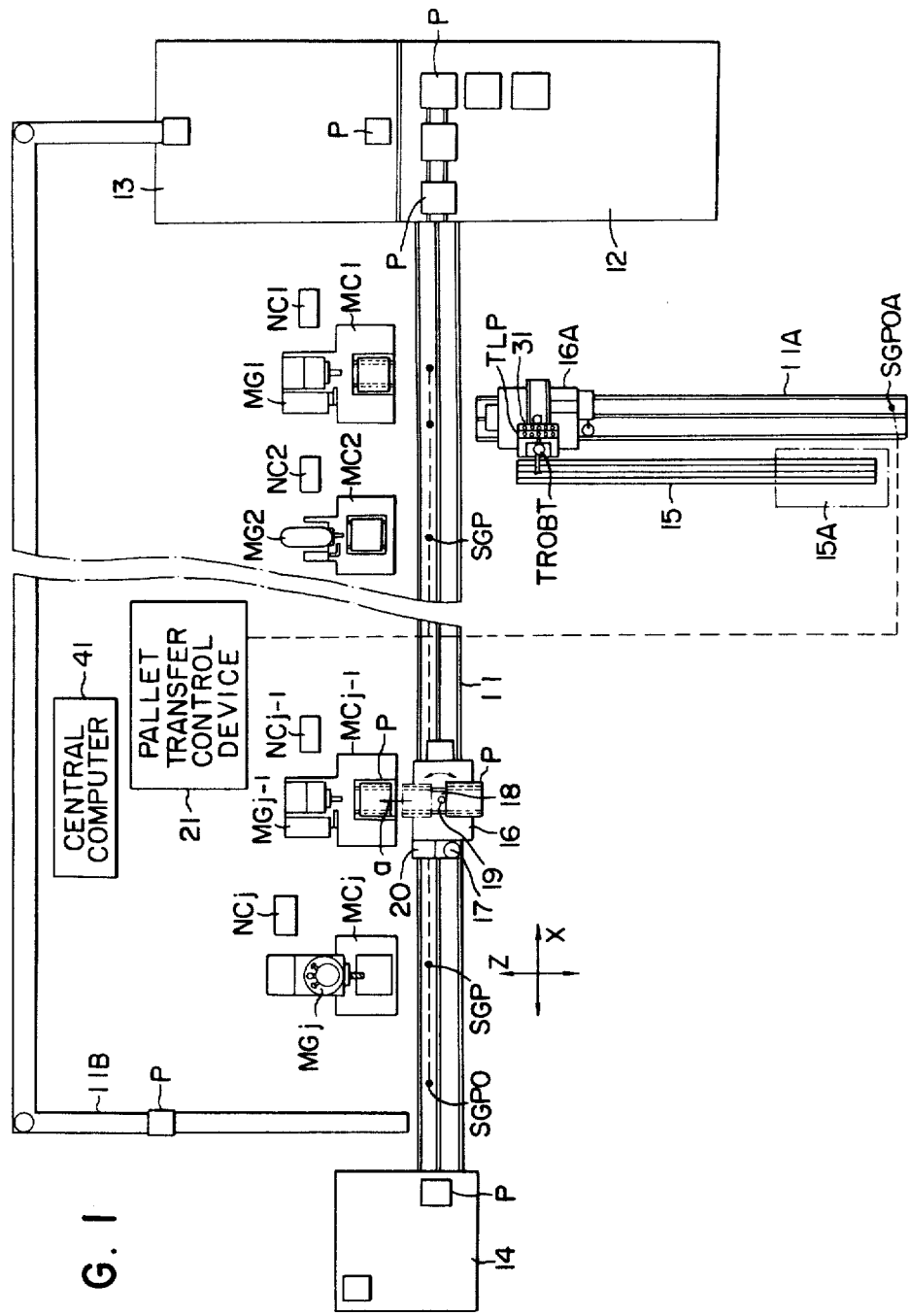
FIG. 1 is a plan view showing the layout of machine tools to which the automatic control system of this invention is applicable.

The layout of machine tools, a pallet transfer line, etc. which constitute the automatic operating system of this invention is shown in FIG. 1. As shown, a transfer line 11 is provided at the center to extend in X direction, and a plurality of machine tools that is machining centers MC1—MCj are installed along the transfer line 11. Respective machining centers are provided with NC control devices NC1, NC2, . . . NCj and tool magazines MG1, MG2, . . . MGj respectively. Although not shown in FIG. 1, as will be described later, each NC control device contains a power distribution panel (PDP) including a sequence control device and a detecting unit which characterizes the invention.

At the righthand end of the transfer line 11 is provided a waiting area 12 for accommodating pallets P on which workpieces to be machined are mounted and secured. At the lefthand end of the transfer line 11 is provided an area 14 for collecting pallets which carry workpieces whose machinings have been interrupted for the reason described below.

A selfpropelling carriage 16 which carries pallets is mounted on the transfer line 11 so that by driving the wheels 17 of the carriage 16 it can be moved to any desired position along the transfer line 11. Two pallets can be mounted at the same time on a guide 18 supported by a pivot pin 19 secured to the carriage to be swingable about the pivot pin 19. A transfer bar, not shown, is provided for the guide 18 for loading and unloading the pallet P onto and from the guide 18 so that when the transfer bar is operated the pallet is moved onto the table of a machining center or moved onto the carriage from the table as shown by an arrow a.

A control device 20 is provided to control various operations including the movement of the carriage 16 on the transfer line 11, 90° rotation of the guide 18, the advance and retraction of the transfer bar. The informations from a pallet transfer control device 21 for these operations are applied to signal transmitter-receivers SGP and SGPO located at suitable positions along the transfer line 11. The informations are supplied to the control device 20 from the transmitter-receivers SGP and SGPO through terminals provided on the lower surface of the carriage. Transmitter-receivers SGP are provided for respective machining centers while the transmitter-receiver SGPO is located at the wating position (at the lefthand end of the transfer line 11) of the carriage 16.

Figure 2A:
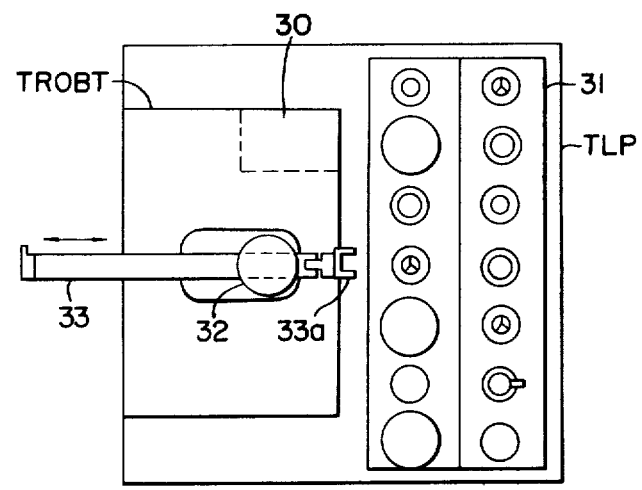
FIG. 2A is a plan view showing a tool robot.
Figure 2B:
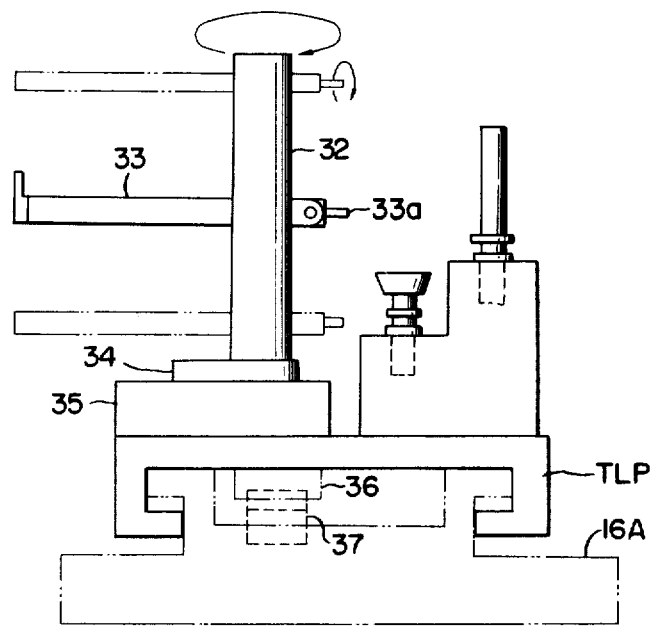
FIG. 2B is a side view of the tool robot shown in FIG. 2A.

As shown in FIG. 1, a transfer line 11A is provided for supplementing tools which are contained in a tool shelf 15 and have been set for operating condition. A carriage 16A similar to the carriage 16 is mounted on the transfer line 11A to be movable therealong. On the carriage 16A is mounted a tool pallet TLP including a tool container 31 adapted to accommodate a plurality of tools. As shown in FIGS. 2A and 2B, a tool robot TROBT is carried by the tool pallet TLP so as to grasp a tool contained in the tool shelf 15 for accommodating the tool in the tool container 31. Furthermore, the tool robot operates to put tools contained in the tool container 31 in a tool shelf 15A which accommodates defective tools. Tools are arranged in the tool shelf 15 such that tools of the same type are grouped so as to simplify the positioning of the carriage 16A and the operation of the tool robot TROBT. The tool pallet TLP is transferred from carriage 16A onto carriage 16 at a position along the transfer line 11A and near the transfer line 11 and then moved to the table of any machining center MC by the carriage 16.

Furthermore, the tool robot TROBT operates to mount a desired tool (one or more) on the spindle of a given machining center MC and to remove a tool which has been judged broken or worn out for accommodating it in the tool container 31 on the pallet TLP. The shelf 15A is provided for receiving defective tools that have been judged broken or worn out.

Informations regarding the sequential operation of the tool robot TROBT on the transfer line 11A and on the machining center MC are applied to the carriage through the transmitter-receiver SGPO from the transfer control device 21 together with the informations (instructions) regarding the movement of the carriage 16A and stored in a memory device which is also provided for the carriage 16A contained in the pallet TLP when the carriage 16A is positioned at the position of the transmitter-receiver SGPO at the front end of the transfer line 11, that is the waiting position of the carriage 16A. Consequently, when the carriage 16A stops at a suitable position along the transfer line 11A the tool robot TROBT sequentially reads and understands the content of the memory device so as to perform a series of operations described above.

Also when the pallet TLP is moved on the table of a machining center, the tool is exchanged between the spindle and the tool magazine according to an information stored in the other portion of the memory device.

It is possible to amplify an information given by the transfer control device 21 so as to supplement new tools and collect defective tools to and from a plurality of machining centers while the pallet TLP is moved along transfer line 11.

The electric power for operating the self-propelling carriages 16 and 16A and the tool robot TROBT is supplied from the central conductors of the transfer lines 11 and 11A respectively. Where the system contains an electric source the power supply terminals are provided at the waiting positions SGPO and SGPOA of the transfer lines 11 and 11A.

As shown in FIG. 2A, on the righthand half of a pallet TLP is mounted a tool container 31 comprising two shelves which contain a total of 14 tools in this example.

The tool robot TROBT is mounted on the upper surface of the lefthand half of the pallet TLP and a horizontal arm 33 extends through the supporting column 32 of the tool robot to be movable in the forward and rearward directions.

The lower end of the supporting column 32 is mounted on a rotary member 34 on a base 35 so that a chuck 33a secured to the righthand end of the arm 33 can be brought to any position about the axis of the supporting column 32. As diagrammatically shown, the tool robot is controlled by a control device 30.

As shown in FIG. 2B, the tool pallet TLP is movably supported by a guide rail of the carriage 16A shown by dot and dash lines. A signal receiver 36 is mounted on the bottom surface of the base 35 to oppose a signal supply member 37 mounted on the upper surface of the carriage 16A to be movable in the vertical direction so as to receive the informations regarding the movement of the carriage 16A together with informations regarding the sequential operation of the tool robot TROBT at the position of transmitter-receiver SGPOA shown in FIG. 1. These received informations are stored in a memory device in the control device 30.

Figure 3A:
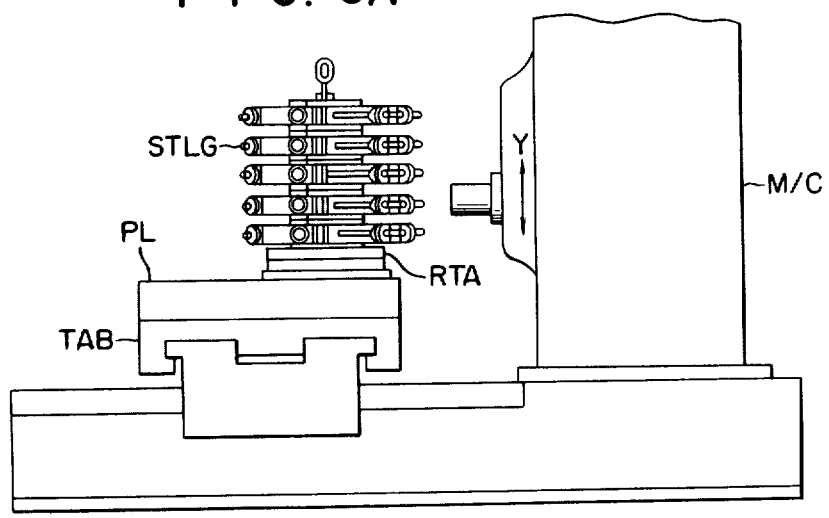
FIG. 3A is a side view showing a tool carrying pallet mounted on a table of a machining center.

FIGS. 3A through 3D show a pallet PL which carries supplementary tools and has a shape and function different from those of the pallet shown in FIGS. 1 and 2. FIG. 3A is a side view showing the pallet PL mounted on the table TAB of a machining center MC and carrying a group of supplementary tools STLG.

Figure 3B:
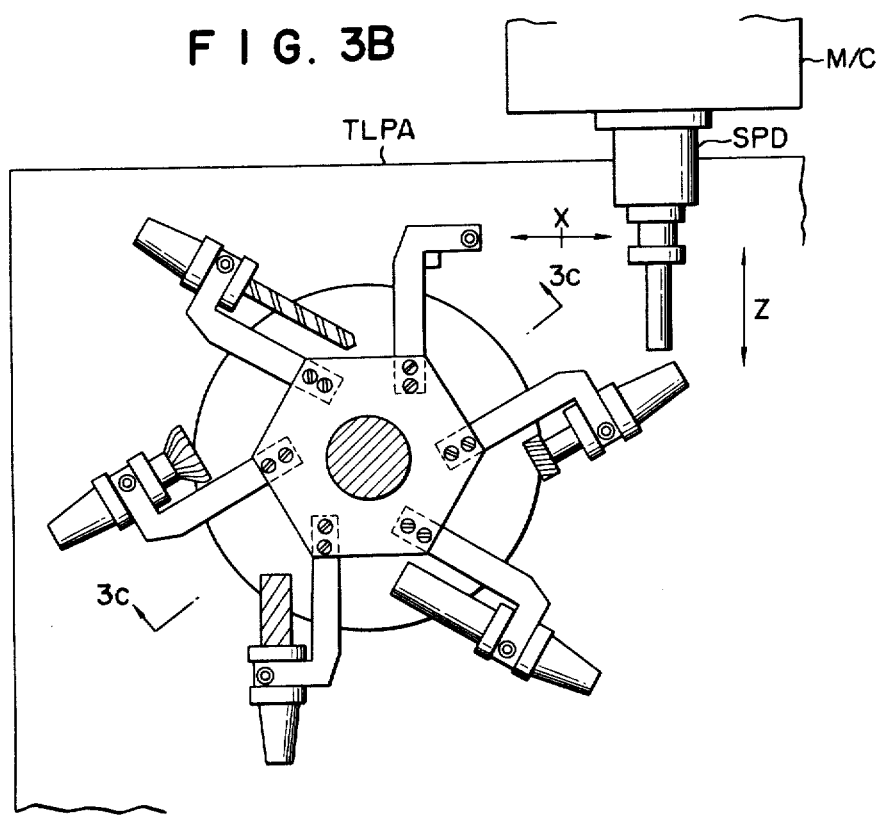
FIG. 3B is a plan view of the tool carrying pallet.
Figure 3C:
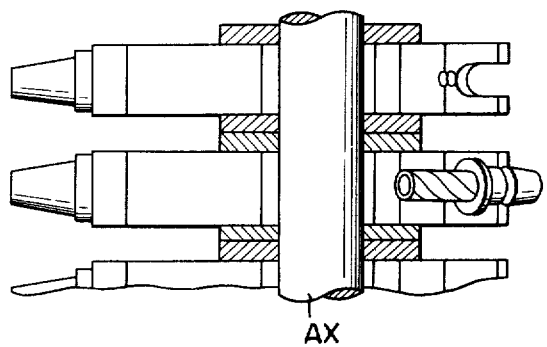
FIG. 3C is a sectional view taken along a line 3C—3C shown in FIG. 3B.

As shown in FIG. 3B, the supplementary tools STLG are radially supported and the tools are brought toward the spindle SPD in the lateral direction as shown by an arrow X so as to dismount a tool from the spindle SPD. A shaft AX carrying the tools is rotated by a rotary table RTA mounted on the pallet PL.

Figure 3D:
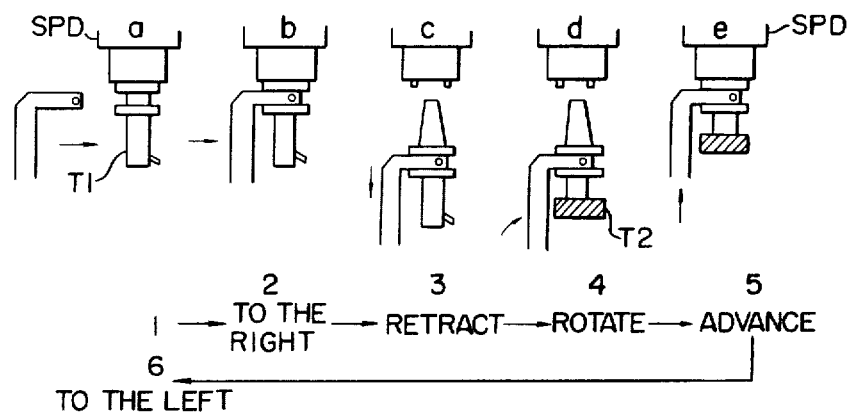
FIG. 3D is a diagram showing the progress of mounting and dismounting a tool onto and from the spindle.

FIG. 3D shows steps a through c for dismounting a tool T1 from the spindle SPD and steps d and e for mounting the other tool T2 on the spindle.

While in FIG. 3A a rotary table is mounted on the pallet PL, it is also possible to rotate the pallet PL by a rotary table provided for the machining center MC so as to index a desired tool for the spindle SPD. With the construction shown in FIGS. 3A through 3D, the transfer line 11A, the tool shelf 15 and the carriage 16A are not necessary. In the case shown by FIGS. 3A - 3D, a plurality of pallets PL each carrying a group of supplementary tools STLG as shown in FIG. 3A are installed on the front side of the transfer line 11 to be moved to a desired machining center MC by the carriage 16.

Figure 4:
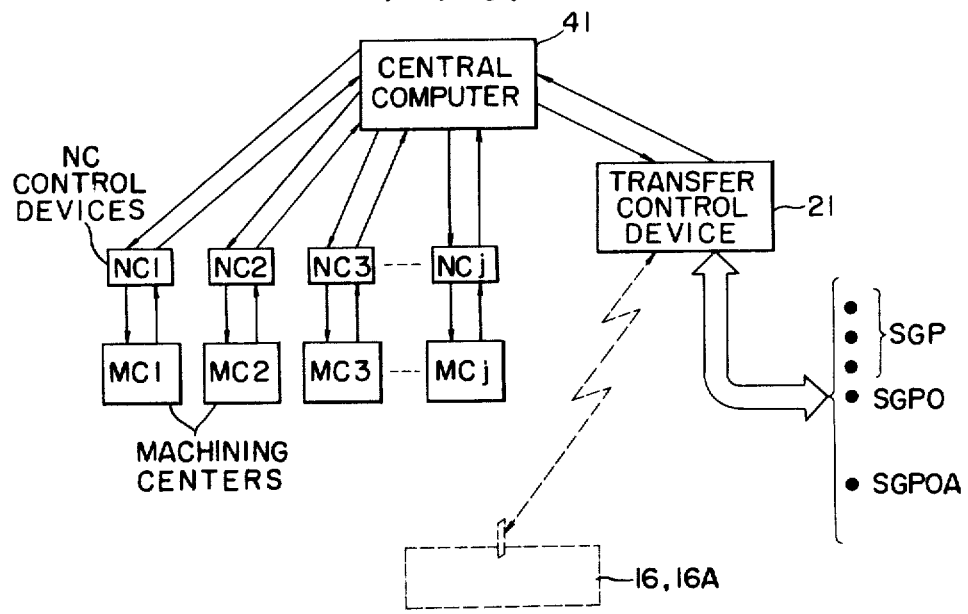
FIG. 4 is a block diagram showing the relationship among the central computer, a transfer control device and respective NC devices utilized in the system of this invention.

FIG. 4 is a block diagram showing the flow of principal control informations in the automatic operating system of this invention shown in FIG. 1. As shown in FIG. 4, the NC devices NC1 . . . NCj of respecitve machining centers MC1 through MCj are coupled with a central computer 41. When a workpiece is mounted on a machining center, for example MCj, the program data for machining the workpiece are transmitted to the NC device NCj from the central computer 41. A signal informing the completion of the machining of the workpiece is sent from the NC device NCj to the central computer. In addition to the signals described above, signals requiring supplement of tools to the machine center MCj and signals informing detection of the breakage of a tool while it is used are also exchanged between the central computer 41 and the machining center MCj. Also, instructions regarding the movement of the carriages 16 and 16A, and informations regarding the movement of a pallet P between the waiting area 12 and the transfer line 11 and between the transfer line 11 and the collection area 14, regarding the movement of pallet P along a transfer line 11A and regarding the sequential operation of the tool robot TROBT on the tool pallet TLP are exchanged between the transfer control device 21 and the central computer 41.

As shown by dotted lines wireless may be used to exchange sequence informations between the transfer control device 21 and the carriages 16 and 16A. Transmitter-receivers SGP, SGPO and SGPOA are arranged at stop positions of carriages 16 and 16A along the transfer lines 11 and 11A.

Figure 5A:
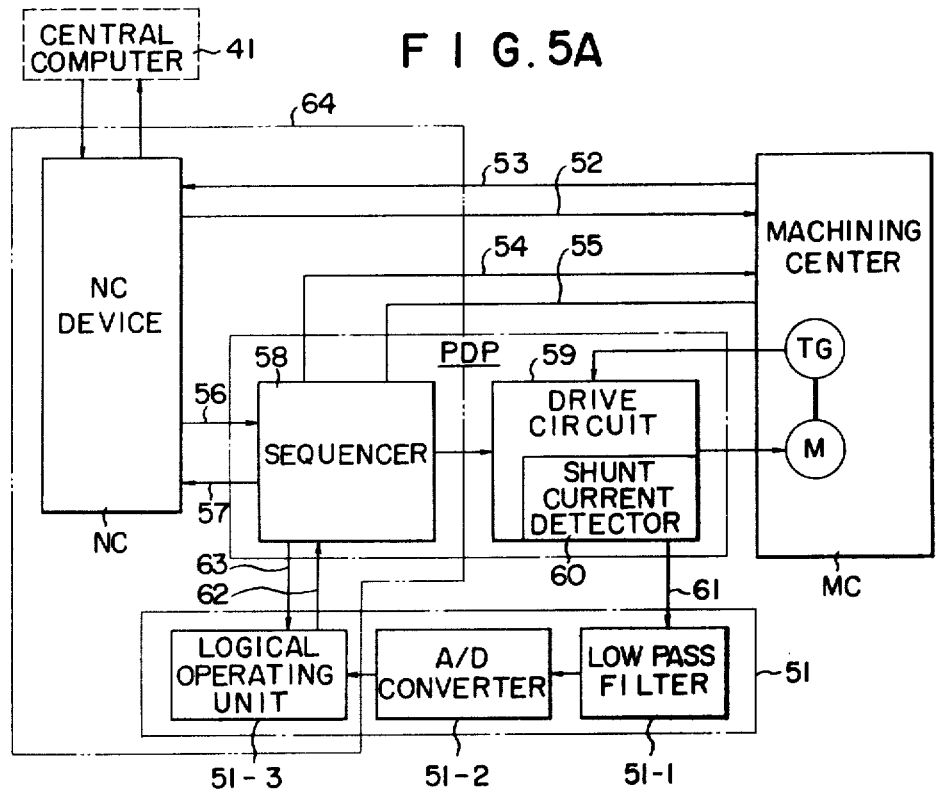
FIG. 5A is a block diagram showing the relationship among a detecting unit, a sequence and an NC device of the system of this invention.

FIG. 5A shows the relationship among any one of the machining centers MC, its NC control device, the power distribution panel PDP and the detecting unit 51 shown in FIG. 1. The NC device applies command pulses to the machining center MC for moving or rotating the table, the saddle rotary table, etc. thereof through a line 52, and a feedback pulse is fed back to the NC device through a line 53.

Line 54 supplies a sequence operation instruction signal to the machining center MC from a sequencer 58 of the power distribution panel PDP, while line 55 supplies sequence completion signals to the NC device from the machining center MC. Signal lines 56 and 57 extend between the NC device and the sequencer 58. A motor M for driving the spindle of the machining center MC is driven by a drive circuit 59. The armature current of the motor M is detected by a shunt current detector 60 while the number of revolutions of motor M is detected by a tachometer generator TG and fed back to the drive circuit 59. The armature current detected by the detector 60 is applied to a logical operating unit 51-3 via a line 61, a low-pass filter 51-1 of the detecting unit 51 and an analogue-digital converter 51-2. The logical operating unit 51-3 is connected to sequencer 58 through lines 62 and 63 to operate as will be described later with reference to the flow charts.

More particularly, when a drill breaks during its use such breakage is detected when data representing the normal cutting condition of the drill has been stored in the memory device of the logical operating unit 51-3 and the data detected during the drilling operation are judged to have a relationship normal cutting current < actual cutting current and a signal of the judgement is sent to the sequencer 58 and then to the NC device whereby the NC device produces an instruction signal to the machining center MC to stop its drilling operation and an instruction signal to remove the workpiece from the working area of the machining center MC. At the same time, the NC device applies a signal to the central computer 41 to cause the transfer control device 21 to make a request for removing the workpiece out of the working area, a request for supplementing the broken drill and a request for mounting a new workpiece.

Lines 62 and 63 constitute interfaces between the sequencer 58 and the logical operation unit 51-3. For example, line 63 is supplied with signals NC, RESET, ONTC, CYLLE START, MO6 COMPLETE, $C_{iX}$, MO5, STP, SSP, SRV (see Table 1 below) and line 62 is supplied with signals requesting judgement of the tool breakage, wear and supplement of the tools.

A unit 64 bounded by dot and dash lines represents a computerized numerical control CNC wherein the NC device, the sequencer 58 and the logical operating unit 51-3 are integrated.

Figure 5B:
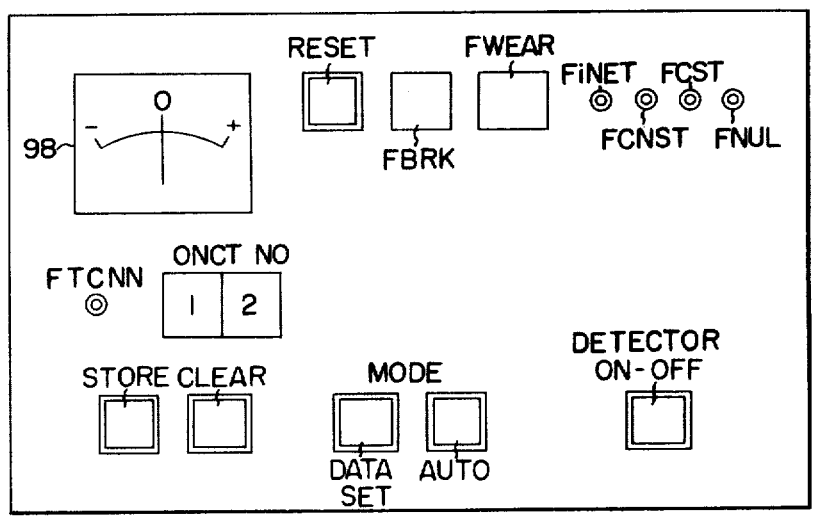
FIG. 5B is a front view of the panel of the detecting unit.

FIG. 5B shows the front view of the panel of the detecting unit 51. An ammeter 98 is mounted on the left upper corner which shows the armature current of the spindle driving motor. During the actual cutting with a new tool under a DATA-SET mode, when the operator depresses a STORE button by noting that the cutting state is normal, the actual cutting current value at that time is converted into a digital quantity from an analogue quantity and the digital quantity is stored in a memory device to correspond to the tool number (ONTC No.) of the tool being utilized at that time.

A clear push button is used to clear the data of the ONTC tool under the DATA-SET mode. A lamp FTCNN is lighted when the actual cutting data of a tool NN (ONTO NO) are stored. A reset push button RESET is provided for all flags except FTCNN, and lamps FBRK and FWEAR are lighted when the tool is judged that it has been broken or worn out. Lamps FiNET, FCNST, FCST and FNUL are lighted when the normal cutting current value is stored in iNET, when the normal cutting operation is commenced, when the cutting start is judged, and when the no load current is stored respectively.

Figure 6:
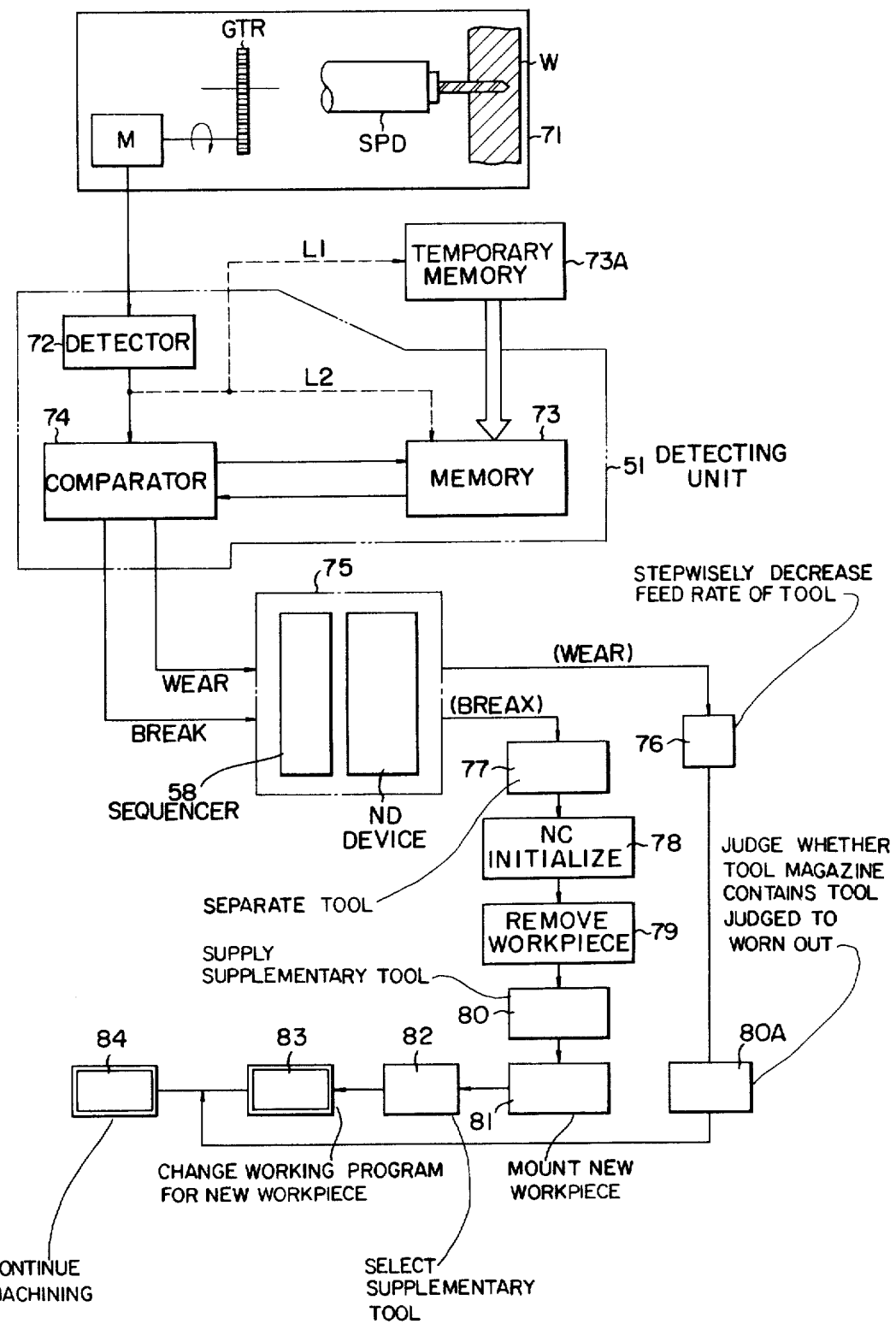
FIG. 6 is a block diagram showing the detail of the block diagram shown in FIG. 5A.

FIG. 6 shows a manner of forming an opening through a workpiece W by mounting a drill on the spindle SPD and by rotating the same with a drive motor M through a gear train GTR. The armature current of the motor M is applied to a detector 72 of the detecting unit 51 including a low pass filter and an A-D converter, not shown. Reference character 73 shows a memory device having a plurality of memory areas or addresses for storing various data for each tool including a current value iNETNN corresponding to the normal cutting state of the tool (its number is designated by NN), a signal FTCNN which shows that the signal iNETNN has been stored, a signal FTBNN representing that the tool NN was judged broken, a signal FTWNN representing that the tool was judged worn out, and a signal FCOMNN showing that the tool NN is one of the tools of the same type. A temporary memory device 73A is provided to receive the current value iNETNN from the detector 72 through line L1 and then supplies it to the memory device 73. The use of the temporary memory device 73A is convenient where all of the normal cutting current values iNETNN of various tools are stored in the memory device 73A before the operation of the automatic system. As has been described in connection with the pannel shown in FIG. 5B, the value of the cutting current iNETNN is stored in the temporary memory device 73A when a skilled operator judges that the cutting state is normal by observing the ammeter.

If a numerical data regarding iNETNN of a tool NN were available, it is not necessary to detect the actual value of iNETNN by actual cutting test of the tool NN used.

For a number of tools of the same type the same value of iNETNN may be stored. Line L2 is used to supply the value iNETNN directly to the memory device 73 from the detector 72 without passing through the temporary memory device 73A. A comparator 74 having a logical operation performance is provided to calculate a value IV in accordance with a value of the cutting current iCNSTNN when the tool NN is actually machining the workpiece W and then compare the value IV with iNETNN. When the value IV is larger than iNETNN by predetermined times, it is judged that the tool is broken or worn out. These judgement signals are also applied to the memory areas of the memory device 73 which stores data FTWNN, FTBNN, etc. The break judgement signal and the wear judgement signal are applied to a unit 75 containing the sequencer 58 and the NC device. When the wear judgement signal is applied the operation is advanced to step 76 for stepwisely decreasing the feed of the tool NN by an instruction from the NC device. Where the break judgement signal is applied to unit 75, the operation is transferred to step 77 to execute a retract cycle thereby separating the tool NN from the workpiece W. Under these conditions, if necessary, the rotation of the spindle SPD is stopped. Then the program operation is advanced to step 78 to initialize the NC device. At step 79 the workpiece W is transferred to the transfer line 11 from the table that is the working region of the machining center MC.

At step 80, where a tool that can be substituted for the tool that has been judged broken is not stored in the tool magazine of a machining tool, the supplemental tool is supplied from the tool shelf before mounting a new workpiece on the machining center MC at step 81. At step 82 a substitute tool is selected, and at step 83 the working program of the newly mounted workpiece is changed to that which the NC device can execute. Step 84 shows that the machining is to be continued, and at step 80A a judgement is made as to whether the tool magazine of the machining center contains a tool that can substitute the tool judged worn out or not. Where such tool of the same type is not available, a supplement signal thereof is applied to the transfer control device 21 through the NC control device NC and the central computer 41. However, the supplement of the tool is not performed immediately but the tool is put into the tool magazine before the next new workpiece is mounted.

Steps 80 and 80A may be omitted where the tool magazine contains a sufficient number of substitute tools as spares.

Figure 7:
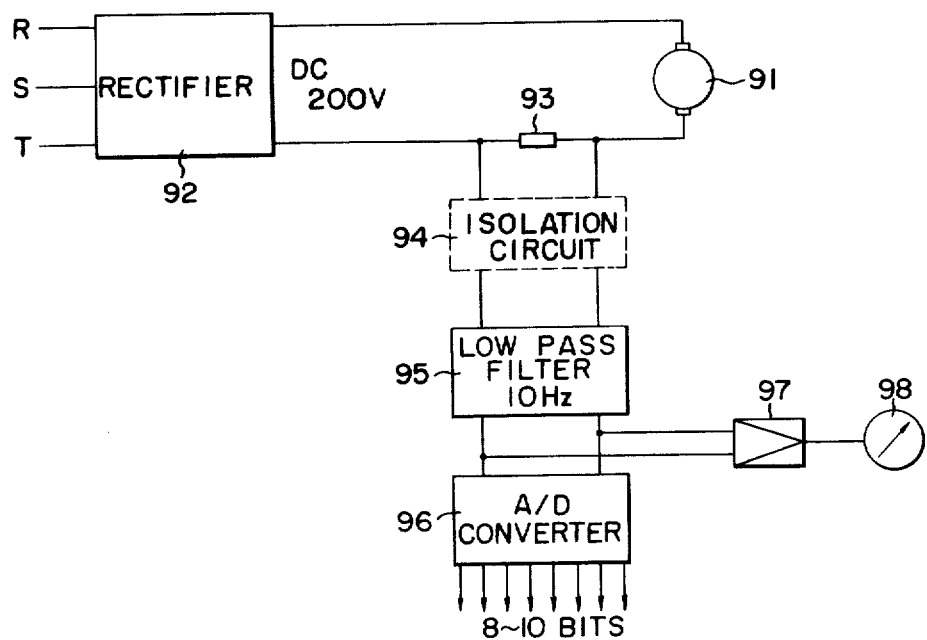
FIG. 7 is a block diagram showing one example of a circuit for detecting a cutting current.

FIG. 7 shows the detail of the detector 72 shown in FIG. 6. The detector 72 comprises a rectifier 92 for driving a spindle driving motor 91, a shunt 93 connected in series with the armature of motor 91, an isolation circuit 94, a low-pass filter 95 connected to the output of the isolation circuit 94, an A/D converter 96 connected to the output of the low-pass filter 95 and an ammeter 98 connected to the output of the low-pass filter 95 via an amplifier 97. The output of the A/D converter 96 comprises 8 to 10 bits and utilized as signal iNETNN, for example.

FIG. 8 shows the memory regions or areas of the memory device 73 shown in FIG. 6 and data stored therein corresponding to respective tools NN. In FIG. 8, the tool numbers are shown by decimal numbers of two orders. Symbol 00 is used to identify the groups of tools of the same type. For each tool, the normal cutting current vaue iNETNN is constituted by 8 bits, signal FTCNN showing that the signal iNETNN is stored by one bit, signal FCOMNN by 5 bits and signals FTBNN and FTWNN by one bit respectively. Tool numbers 01, 02, 03 and 04 represent tools of the same type. In the same manner, 05 and 06 represent the tools of the same group (FCOMNN=00010), 07 and 08 mean that FCOMNN=00011, and 09 means that FCOMNN=00100. Signals iNETNN for tool numbers 01, 02, 03 and 04 are zero and FTCNN=0 of these tool numbers shows that the normal cutting current values of tools 01–04 are not stored.

As the signals iNETNN of tools 05 and 06, the same value 01011001 is stored so that signals FTCNN are 1. However, for tool 05, FTBNN=0 and FTWNN=1 show that a wear judgement has been made. For tool 06, FTBNN=1 and FFWNN=1 mean that a wear judgement was made during cutting and then break judgement was made. For tool 09, iNETNN=10010001 and FTCNN=1 mean that either one of the wear and break judgements has not yet been made.

FIGS. 9 to 17 show flow charts showing the operation of the system diagrammatically shown in FIG. 6, and the meanings of various signals are shown in Table 1 at the end of the specification.

Figure 9A:
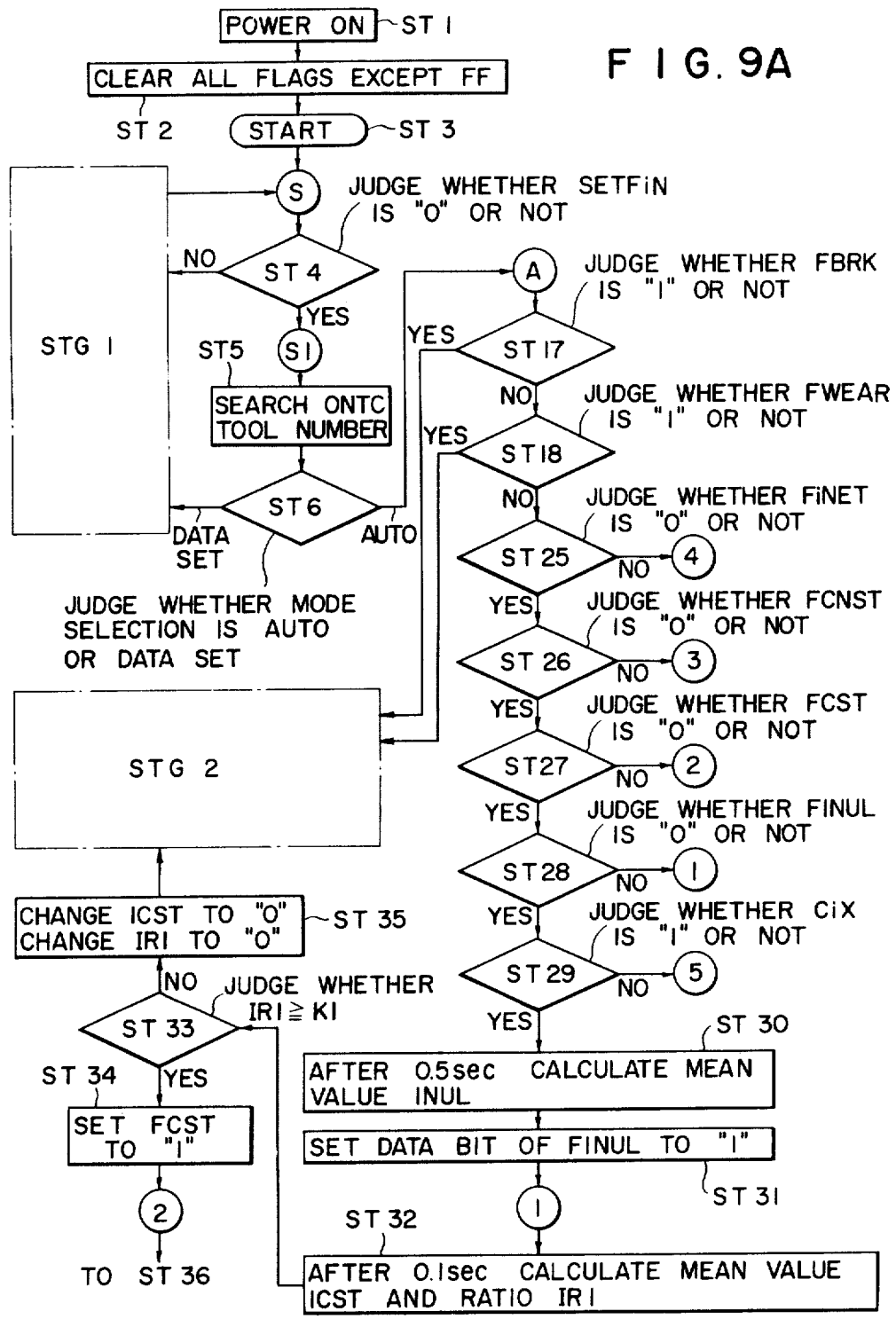

Referring first to FIGS. 9A and 9B when a source is connected at step 1 (hereinafter a step is abbreviated as "ST"), all data of the memory device except data iNETNN, FTCNN, FCOMNN, FTBNN and FTWNN and flags (signals utilizing F as the first letter) are cleared at ST2.

Where a start instruction is applied at ST3 the program is advanced to ST4 at which a judgement is made as to whether the bit state of the data SETFiN stored in a data memory device in the comparator 74 if "0" or not. The data SETFiN means that a tool NN (termed ONTC TOOL) is mounted on the spindle and a signal FTCNN showing that the data SNETNN of the tool has been stored in the memory device 73 is "1".

At ST2, since SETFiN is cleared, the program is advanced to ST5 at which the address of the memory device 73 (FIG. 6) storing the tool number NN of the tool ONTC TOOL now being mounted on the spindle is searched, thus finding out addresses of the data iNETNN, FTCNN, FCDMNN, FTBNN and FTWNN corresponding to this tool number.

Then the program is advanced to ST6 to check whether the mode selection is AUTO or DATA SET. In the case of AUTO the execution of the program is transferred to a junction Ⓐ. On the other hand, where the mode is AUTO SET, a step group STG1 consisting of ST7 through ST16 is executed. The step group STG1 shows one example of setting the data iNETNN in one of the data areas of the memory device 73 shown in FIG. 6.

At ST9 when the spindle is rotating at a speed above a definite value (CiX="1") the operator judges the cutting state of the ONTC TOOL Tj by reading the ammeter and when the cutting current value is normal he turns ON the store push button.

At ST11, whether the store push button is ON or not is judged. When the result is YES, the program is advanced to ST12 where after 0.1 sec., for example, the cutting current is sampled 8 times and the mean value IC is calculated. Then, at ST13, the mean value IC is stored in the iNETNN region of the memory device 73 (at this time NN=j). At the same time, a flag FTCNN showing that the data iNETNN has been stored is set to "1". Then, at ST14 the data bit of SETFiN is set to "1" and the program is returned to a junction Ⓢ. Where the result of ST9 is NO, that is when the speed of the spindle is less than a predetermined value the program is advanced to ST10 to judge whether the clear button is ON or not. When the result is YES at ST15, "0" is stored as the data bit of data iNETNN and FTCNN and then "0" is stored at ST16 as the data bit of SETFiN. Then the program is returned to the junction Ⓢ. When the result of ST10 is NO the program is returned directly to the junction Ⓢ. When ST16 is executed, as the data iNETNN is not stored in the memory device 73, steps ST4→ST5→ST6 are executed again and this execution loop of the program would be repeated until CiX becomes "1" at ST9. When the step ST14 is executed the storing of the data iNETNN for tool Tj is completed, the execution loop ST7→→ST10→ⓢ would be repeated until the next tool T(J+1) is mounted on the spindle by the MO6 completion signal.

When the result of judgement at ST7 is YES, that is when MO6 is completed and the exchange of the next new tool T(j+1) is completed, at ST8 data SETFiN is firstly made to "0" so that the data iNETNN (NN=j+1) for the next tool T(j+1) would be stored. Thus, cutting is made with the new tool T(j+1) and the data iNETNN is stored in a corresponding memory region. The same operations are performed for the tools contained in the tool magazine of a given machining center.

The process of executing the program where the judging step ST6 is of a mode AUTO will be described hereunder.

At this time, at ST17 and ST18, the data bits of break judging data FBRK, and wear judging data FWEAR stored in the read access memory device (RAM), that is the data memory device in the memory device 73 shown in FIG. 6 are checked. When the result of either ST17 and ST18 is YES, the program is transferred to step group STG2. At ST25, the actual cutting current of the tool (ONTC TOOL) mounted on the spindle is judged and when it is judged to be equal to the normal cutting current, the data FiNET becomes "1". Then, the program proceeds to ④. At ST25, if FiNET="0", the program is transferred to ST26 and when the result of judgement of ST26 is FCNST="1", that is the normal cutting state, the program is transferred to ③. If the result of judgement at ST26 is FCNST="0", the program is advanced to ST28 and when the result of judgement of this step is FINUL="1" that is a case wherein no load current is stored, the program is transferred to ①. Where the result of ST28 is FINUL="0", the program is advanced to ST29 where judgement is made as to whether the spindle has reached a predetermined speed or not. Where CiX="0", that is when the speed of the spindle is below the predetermined speed the program is transferred to junction ⑤. When the result of ST29 is CiX="1", at ST30 the no load current INUL is calculated a definite time (TM1=0.5 sec.) after, which is set by a timer TM1 (not shown). At this time, the new tool OTNC TOOL does not start cutting. The no load current INUL is obtained by sampling 8 times the coded armature current Ii and then calculating the mean value $$\tfrac{1}{8} \Sigma \mid Ii \mid \rightarrow INUL$$

The data INUL is stored in a data memory device (contained in the memory device 73, for example).

At ST31 the data bit of FINUL is set to "1" for the purpose of showing that the data INUL has been stored. Thus, the bit ("1" or "0") of this data FINUL shows that whether the no load current has been stored or not.

At ST32 the mean value ICST is calculated 0.1 sec. after which is set by a timer TM2 (not shown) by sampling 4 times the armature current at an interval of 40 ms. Also the ratio IR1 of ICST to INUL is calculated.

At the next step a judgement is made as to whether IR1 is equal to or larger than a predetermined constant K (K=1.2 for example). If the result of judgement at ST33 is NO, the values of ICST and LR1 stored in the data memory device of the memory device 73 are made to be "0" respectively.

When the result of judgement at ST33 is YES, at ST34, the data bit of FCST stored in the data memory device is set to "1". This means that the tool ONTC TOOL is judged that it has started cutting.

Turning now to FIG. 10, steps ST36 and ST37 are utilized to judge whether the cutting state is normal or not. Thus, after 0.1 sec. predetermined by a timer TM3, not shown, the cutting current is sampled 4 times with an interval of 40 ms to calculate the mean value ICNST. Thereafter, the cutting current is sampled 4 times to calculate the mean value ICNST2, and then the ratio IR2 of the mean values is calculated. When the result of ST37 shows that the ratio IR2 is larger than a constant K2=0.9 but smaller than a constant K3=1.1, the program proceeds to ST38 where it is judged that whether FCNST is equal to "1" or not, that is whether the cutting is performed under normal state or not. When the result of the judgement at ST37 is NO, data ICNST1, ICNST2 and IR2 calculated at step ST36 and have been stored in the data memory device are cleared. Then the program proceeds to junction ⑤.

Subsequent to ST38, step ST40 is executed. In this step, after 0.1 sec. predetermined by timer TM4, not shown, the cutting current is sampled 8 times to calculate a mean value iNET. Then the ratio IR3 of iNET to INUL is calculated. At steps ST41, ST42 and ST43, the values of constants K5 and K6 which are used in later program steps for judging the wear and break of the tool ONTC TOOL are varied in accordance with the value of ratio IR3. At step ST44 a judgement is made as to whether iNETNN corresponding to the tool ONTC TOOL is stored or not. If the result is YES, at step 45 data iNETNN is changed to data iNET. On the other hand, if the result is NO, at step ST46, after 0.1 sec. predetermined by a timer TM5, not shown, the actual cutting current is sampled 8 times to calculate a mean value iNET, and at step ST47 the mean value iNET is substituted for data iNETNN and set the data bit of data FTCNN to "1".

The program steps ST46 and ST47 are executed when the data iNETNN of step group STG1 under the DAT SET mode is stored in the data memory region of the memory device 73. At ST48, "1" is set as the data bit of the flag FiNET which shows that the normal cutting current has been stored.

Figure 11:
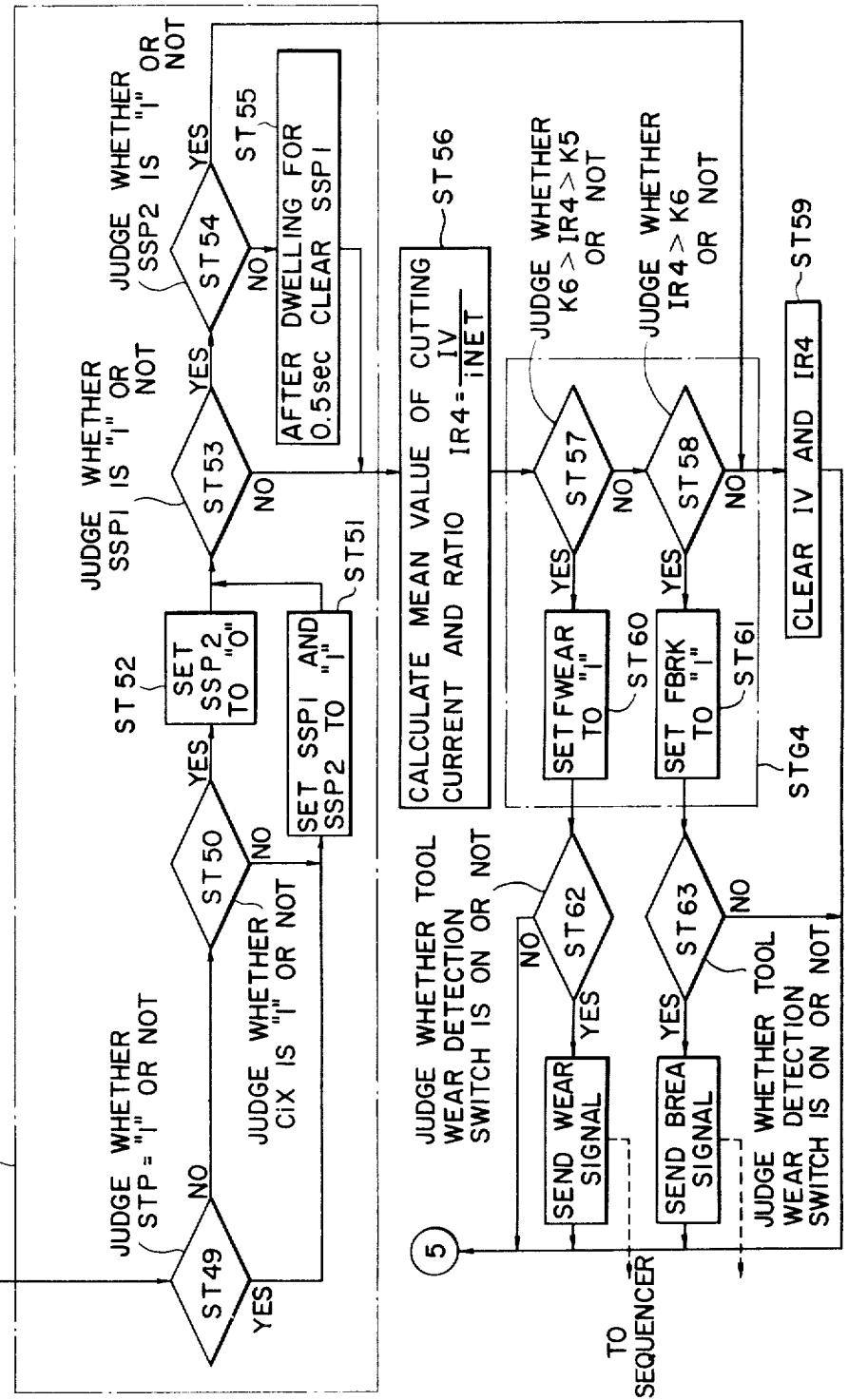
Figure 17:
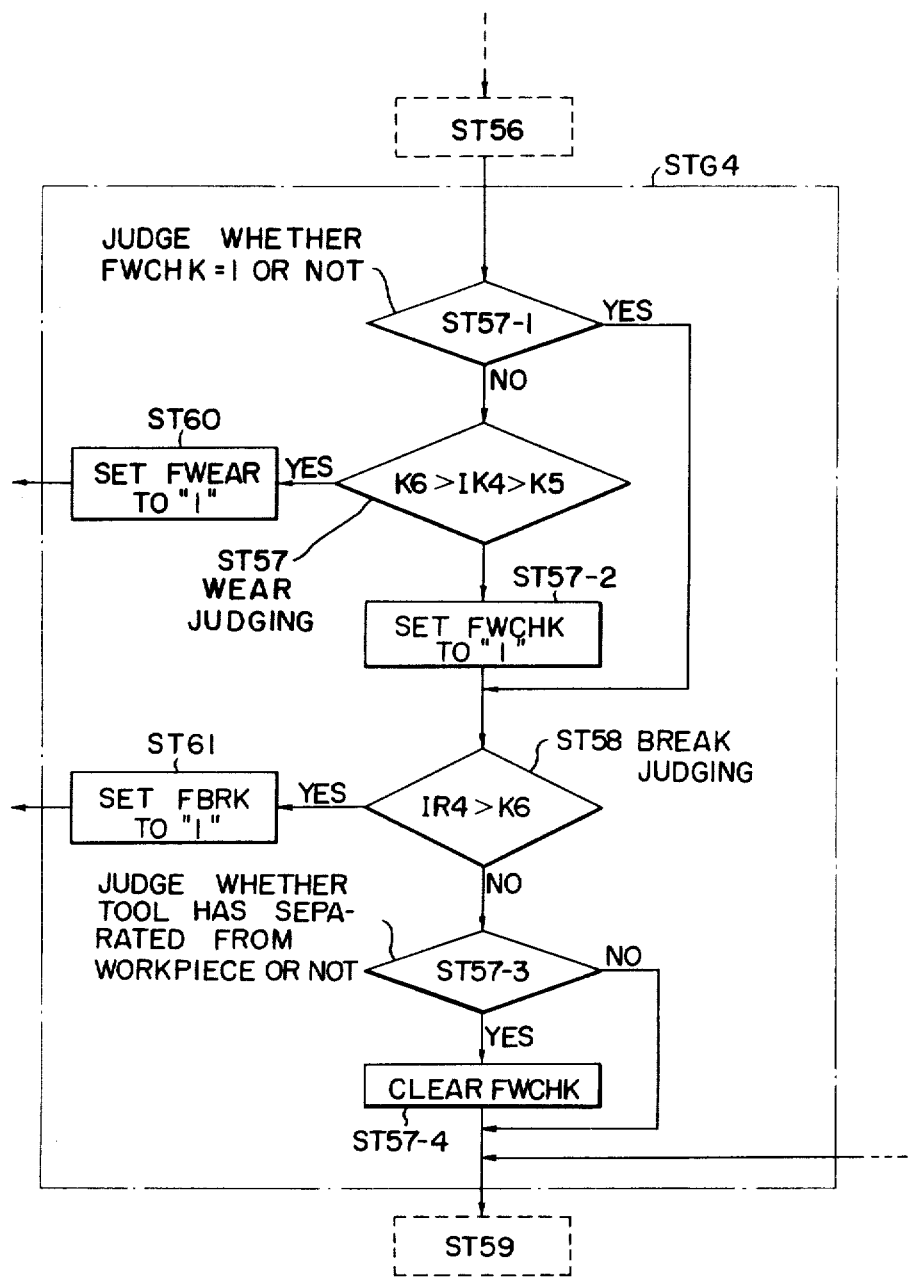
FIG. 17 is a flow chart showing the detail of the tool group STG4 shown in FIG. 11.

Then, the program proceeds to a judging step ST49 shown in FIG. 11. The purpose of a program step group STG3 comprising ST49 through ST55 is to prevent the sampling of the peak current value under a transient rotating condition of the spindle driving motor which occurs when a stop instruction (STP="1") is applied to stop the motor and the motor restarts after 0.5 sec.

More particularly, if STP="1" at ST49, at ST51 the data bits of the signals SSP1 and SSP2 showing the stop of the spindle are set to "1" respectively. If the result of judgement at ST49 is STP="0", at ST50 judgement is made as to whether CiX is "1" or not, that is whether the number of revolutions of the spindle is normal or not. If the result is NO, the program is advanced to ST51. If the result of judgement of ST50 is YES (CiX="1"), at ST52 the data bit of data SSP2 is set to "0".

At ST53 a judgement is made as to whether the data SSP1 is equal to "1" or not. When the result is YES, at ST54 a judgement is made as to whether data SSP2 is "1" or not. If the result is YES, the program is advanced to ST59 to clear the data IV and IR4 which were calculated at ST56. When the result of judgement at ST54 is NO, the program advances to ST55 where after dwelling for 0.5 sec., signal SSP1 is cleared. Signal SSP1 is set to "1" when the spindle stop signal STP becomes "1". Thereafter, when the spindle is restarted and reaches a predetermined speed, signal SSP2 is made to "0". After dwelling for 0.5 sec, SSP1 is made "1". At ST56, after 0.1 sec. set by a timer TM6, not shown, the cutting current is sampled 8 times to calculate a mean value IV and a ratio IR4=(IV/iNET) is also calculated.

Then at ST57, a judgement is made as to whether IR4 lies between constants K5 and K6 which are determined at ST42 or ST43 or not. If the result of judgement at ST57 is NO, at ST58 a judgement is made as to whether IR4 is larger than K6 or not. If the result is NO, at ST59 data IV and IR4 are cleared and the program is transferred to junction ⑤. When the result of ST57 is YES, it means a wear so that at ST60 the FWEAR data bit is set to "1", and at ST60, a judgement is made as to whether a tool wear detection switch is ON or not. If the switch is ON, at ST64 a wear judging signal is applied to the sequencer as shown by dotted lines and the execution of the program is transferred to junction ⑤. If the result of ST62 is NO, that is no wear is detected, the program is transferred from ST62 to junction ⑤. In the same manner, if the result of the judgement at ST58 is YES, that is IR4>K6, at ST61 the data bit of FBRK is set to "1". Furthermore, if the result of the judgement at ST63 is YES, that is when the tool break detection switch is ON, at ST65 a break judgement signal is sent to the sequencer as shown by dotted lines. If the result of ST63 is NO, that is when the tool break detection switch is OFF, the program is transferred directly to the junction ⑤.

Various program steps of the step group STG2 shown in FIG. 9 will now be described.

At ST17 if the tool is judged broken, that is FBRK="1", at ST19 a judgement is made as to whether the NC device has been reset or not. If the NC device has been reset, all flags and data INUL, ICNST1, ICNST2, iNET, IV, IR1, IR2, IR3 and IR4 except iNETNN, FTCNN, FCOMNN, FTBNN, FTWNN are cleared at ST20.

After executing ST3, the program is transferred to junction ⑤. If the result of ST19 is NO, that is if the NC device were not reset, the program proceeds to junction ⑤, and at ST21 a judgement is made as to whether M06 has been completed or not, that is whether exchange of the new tool has been completed or not. If the result of ST21 is YES, the data and flags are cleared as above described. If the result of ST21 is NO the program proceeds to junction Ⓐ.

At ST18, if the tool wear judging flag FWEAR is "1", at ST22 a judgement is made whether a cycle start is ON (YES) or not. If the result is YES, at ST23, flag FWEAR is cleared. Then at ST24, the FEED HOLD is cleared by the NC device and the program proceeds to ④.

If the result of ST22 is NO, or CYS is not ON the program is transferred to ST19.

FIG. 12 is a flow chart showing the program steps of step group STG2 shown in FIG. 9 which are substituted by a computerized NC device. In FIG. 12, when the result of ST17 is YES, the program is advanced to ST17-1 where a judgement is made whether break judging flag FTBNN is "1" or not. If the result is NO, at ST17-2 the flag FTBNN is set to "1". On the other hand, if the result is YES, the program is transferred directly to ST17-3 where a judgement is made as to whether the bit of BRESET is "1" or not. If the result is YES, at ST17-4 break judging flag FBRK="1" is cleared and then the program returns to Ⓐ. If the result of ST13-3 is NO, at ST17-5 a judgement is made whether M06 has been completed or not. When the result of ST13-5 is YES, the program is advanced to ST17-7 to clear all data and flags other than those pointed out before and program is returned to junction ⑤. If the result of ST15-5 is NO, at ST-6 a judgement is made as to whether NC device has been reset or not. If the result of ST17-6 is YES, the program is transferred to ST17-7, whereas when the result is NO, the program proceeds to junction Ⓐ.

In the same manner, at ST18 a judgement is made whether the wear judging flag FWEAR is "1" or not and when the result is YES, at ST18-1 a judgement is made whether flag FTWNN is "1" or not. If the result of ST18-1 is NO, at ST18-2 the flag FTWNN is set to "1", whereas when the result is YES, at ST18-3 a judgement is made whether WRESET is "1" or not. When the result of ST18-3 is YES, at ST18-4 the wear judging flag WEAR is cleared and the program proceeds to the junction Ⓐ. The program also proceeds to the junction Ⓐ when the result of ST18-3 is NO.

The program steps shown in the flow charts shown in FIGS. 9–12 are executed successively in a manner described above. FIG. 13 shows a modification of the flow chart shown in FIG. 11. More particularly, while a tool (ONTC TOOL) NN is used to work a workpiece, suppose now that it is judged that the tool has broken. The flow chart shown in FIG. 13 is constructed such that, when a flag FTBNN regarding all tools $NN_1$–$NN_n$ belonging to a tool group in a tool magazine including the tool NN is "1" before any one of the tools in the tool group is designated for use to work a next workpiece, a tool supplement instruction is provided to assure at least one sound tool NN in the tool group in that tool magazine.

When the result of judgement of ST62 shown in FIG. 11 is YES, at ST66 a judgement is made as to whether the tool break judging flag FTBNN or the tool wear judging flag FTWNN of all tools of a tool group in which the values of FCOMNN of the tools which have been judged broken are the same.

When the result of ST66 is YES, it means that there is no sound tool NN in the tool magazine and the program proceeds to ST66 where a judgement is made as to whether a new tool request flag FNTCAL is "1" or not. If the result of ST67 is NO, at ST68, the flag INTCAL is set to "1", whereas when the result is YES, an instruction is generated for supplementing a new tool NN in the tool magazine to the carriages 16 and 16A, tool pallet TLP and tool robot TROBT shown in FIG. 1, via sequencer 58, the ND device, and the central computer shown in FIG. 5A. At ST70, a judgement is made whether at least one tool has been supplied to the tool magazine to supplement the broken tool or not. If the result of ST70 is NO the program returns to ST67.

If the result of ST70 is YES, the break flag of the supplemented tool is cleared at ST71 to show that the broken tool has been substituted by a sound tool. Where a worn out tool is to be supplemented, steps similar to steps 66–72 are executed. For example, at a step corresponding to ST66 a judgement is made as to whether the flag FTBNN or FTWNN of a tool of FCOMNN is "1" or not. However, when a tool TFW is judged worn out, the machining of a workpiece I is still continued instead of exchanging the workpiece I with a new workpiece II as in the case where the tool is judged to be broken.

Accordingly, even when the operation of the tool TFW is finished, the machining of the workpiece I is not completed so that during the remaining machining steps the tool TFW would be selected again. Where there is no sound tool having the same type as the tool TFW remaining in the tool magazine it would be impossible to continue the machining of the workpiece I. Accordingly, it is necessary to remove the workpiece I from the machining area of the machining center and to supplement a new tool to the tool magazine. Since this procedure is inconvinient, where a tool supplement instruction is generated as a result of a wear judgment, instead of applying the supplement instruction when the flag FTBNN or FTWNN of all tools of FCOMNN becomes "1" as above described, it is more advantageous to generate the tool supplement instruction in a case in which the flag FTWNN of only one tool in the tool group of FCOMNN is "0".

FIG. 14 shows a tool selection routine where sequencer 58 receives a tool code. Thus, when a tool code is applied, at ST73 the tool code is temporarily stored in a spare tool register SPTREG in the data memory device. Then at ST74, a judgement is made as to whether the break judging flag FTBNN corresponding to a tool designated by the tool code is "1" or not. When the result of ST74 is YES, the program advances to ST76, whereas when the result is NO the program advances to ST75 where a judgement is made as to whether the wear judging flag FTWNN is "1" or not. If the result of ST75 is NO, at ST81 the count of register SPTREG is changed to the value of TOOL BUFFER (TBR). By the automatic tool exchange, a tool at the position of a tool pot in the tool magazine designated by TBR is exchanged with the ONTC TOOL mounted on the spindle. On the other hand, when the result of ST75 is YES, at ST76 a tool having a lower tool number (TNEW) belonging to the same tool group is searched in response to FCOM corresponding to a tool NN having a tool number corresponding to the count of SPTREG. Then at ST77, the presence of the tool TNEW is checked. When the result of ST77 is YES, at ST78 a judgement is made as to whether the flag FTBNN or FTWNN or tool TNEW is "1" or not. If the result of ST78 is YES, at ST79 one is added to the count of SPTREG and then the program proceeds to ST76. If the result of ST78 is NO, at ST80 the bit data of TNEW is set in register SPTREG. Then the program is advanced to said step ST81. If the result of ST77 is NO, at ST82 a message showing that there is not substitute tool is displayed. At ST83, after producing an emergency stop instruction, the control system is turned OFF. Tools are supplemented as shown in FIG. 13 so as to prevent steps ST82 and ST83 from being executed actually.

The flow chart shown in FIG. 15 shows a sequence of a control signal which is supplied to a machining center from an NC device in response to an instruction from the step ST65 shown in FIG. 11. AT ST101 a judgement is made whether the break judging flag FBRK is "1" or not. When the result is YES, the feed of a tool is stopped. After 1 sec., the NC device gives a RESET signal at ST103. Then at ST104 a retract instruction along Z axis (FIG. 1) is given so as to disengage the tool from the workpiece I. Then, at ST105 the workpiece I is moved to the zero position in the machining area of the machining center. Then at ST106 the rotary table also is returned to the 0° position to wait for transferring the workpiece onto the transfer line 11. In the absence of a tool pallet TLP for supplementary tools, the next workpiece II is transferred to the pallet exchange position of the machining center MC by the carriage. Where a pallet carrying supplementary tools arives at first, the pallet exchange operation on the carriage 16 is executed in two steps as follows during the pallet change cycle (P.C. cycle) of ST107.

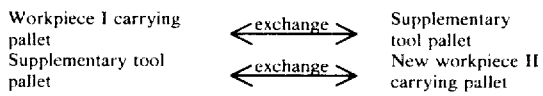

Workpiece I carrying pallet ⇐exchange⇒ Supplementary tool pallet
Supplementary tool pallet ⇐exchange⇒ New workpiece II carrying pallet At ST108, the NC device causes a new machining program to the new workpiece II (in the case of a tape rewind type). In this embodiment, the NC device receives the machining program for the new workpiece II from the central computer 41. Then at ST109, after 0.1 sec., BRESET is set to "1", and after one sec. a cycle start signal is given at ST110 for 0.3 sec. When the result of ST101 is NO the previous machining program is continued without executing steps 102 through 110.

FIG. 16 shows a routine when a wear detection signal is applied to an NC device from ST64 shown in FIG. 11.

At ST111 a judgement is made as to whether the tool wear judging flag FTWNN is "1" or not. When the result is YES, at ST112 the feed speed of the tool NN relative to a workpiece instructed by the program is decreased 10%, for example. At ST113 a judgement is made whether the reduced feed speed is more than 30% of the value instructed by the program or not. If the result is YES, at ST115, WRESET is set to "1" after 0.1 sec. If the result of ST113 is NO, the program proceeds to ST114 to continue the machining by maintaining the feed speed at 30%. If the result of ST111 is NO, the cutting is continued with the feed speed instructed by the program without executing the steps 112–115.

In the flow charts shown in FIG. 9 through FIG. 12 which are executed for detecting worn out tools, for the purpose of preventing a tool from being judged worn out due to increase in the cutting current caused by chips although actually the tool is not worn out, a flow chart corresponding to the step group STG4 shown in FIG. 11 and shown in FIG. 18 is to be executed.

Thus, subsequent to ST56, at ST57-1 a judgement is made as to whether a flag FWCHK representing the wear detection is "1" or not, and when the result is NO, at ST57 the wear detection is made in the same manner as in ST57 shown in FIG. 11. When the result of ST57 is YES, the program advances to ST60 where FWEAR is set to "1". On the other hand, when the result of ST57 is NO, at ST57-2, the flag FWCHK is set to "1". Then, at ST58 a tool break is judged.

When the result of ST57-1 is YES, the program advances directly to break judging step ST-58. When the result of step 58 is NO, at ST57-3 a judgement is made as to whether the tool ONTC TOOL has separated from the workpiece or not. When the tool has separated, at ST 57-4, FWCHK is cleared and then the program advances to ST59. When the result of ST57-3 is NO, the program advances directly to ST59. With the flow chart shown in FIG. 17, where a drill is used as the tool to form an opening, when the result of the wear judging step 57 is NO, since flag FWCHK is set to "1" the opening machining is continued so that even when the cutting current increases due to chips, the wear judging step ST57 would not be executed and only the break judging step ST58 would be performed.

Where the opening is deep, it is necessary to frequently withdraw the drill out the workpiece to remove the chips and then continue the drilling operation. In this case, since at ST57-3 a judgement is made as to whether the tool has separated from the workpiece or not, the wear judgement is performed again.

FIG. 18 shows the relationship between cutting current waveforms and the signals when a drill and a tap are used as the ONTC TOOL. Where a drill is used, a definite time after starting the spindle, the speed of the spindle reaches 70% of the instructed value. Then, CiX becomes "1". 0.5 sec. after, the no load current INUL is stored. Then cutting is started and the cutting start judging flag FCST is set to "1". Thereafter, the normal or steady cutting judging flag FCNST is set to "1". Where the value iNETNN corresponding to the drill is not stored beforehand, the value of iNETNN is measured and stored. Thereafter, iNETNN and IV are compared with each other. When IR4 lies between K6 and K5, the drill is judged to be worn out whereas when IR4>K6, the drill is judged to be broken. The wear and break judgements of the tap are performed in the same manner. When the direction of rotation of the tap reverses, STP becomes "1" during which no wear and break judgement is made.

FIGS. 19A and 19B show interfaces between the sequencer 58 and the logical operation unit 51-3 shown in FIG. 5A and the contents of respective signals are shown in Table 1 below, and FIGS. 20A and 20B show the waveforms of actual cutting currents. In this case, a 10 $H_z$ low-pass filter was used, the drill had a diameter of 6 mm, the number of revolutions of the spindle was 1250 rpm, the feed speed of the drill was 12.5 mm/min., and 61 perforations were successively formed through a metal plate having a thickness of 19 mm. At the 61st working step the drill was broken.

Numerals applied to respective waveforms represent the number of times of machining the perforations. As shown in FIG. 20A, up to 20th machining step the value of IV is substantially constant, but at the 49th and 50th machining steps, the cutting current increases substantially immediately before the drill penetrates through the metal plate. At the 60th machining step the value of the cutting current exceeds the break judging level, and at the 61st machining step, the drill was broken immediately before it penetrates through. For this reason, when the drilling operation is interrupted by making a tool break judgement at the tool break judging level at the 60th machining step shown in FIG. 20B, the 61st perforation would not be made so that it would be possible to prevent damage of the workpiece caused by the broken drill.

Regarding the progress of the wear of the 6 mm diameter drill, in a condition immediately after assuming the steady cutting state in each of the first, second, 19th, 20th, 49th, 50th, 60th and 61st machining steps, the extent of wear does not vary appreciably. Actually however, it an be noted that the wear proceeds gradually by the fact that the value of the cutting current immediately before the drill penetrates through the metal plate increases gradually.

The result of test shows that the number of breaks and the degree of wear of the drills depend upon the diameter thereof. For example, drills having a diameter of less than 8 mm, the number of breaks is large and the speed of wear has a direct influence upon the break. On the other hand, in drills having a diameter larger than 12 mm, the break does not occur frequently, and only the wear accumulates.

FIGS. 21A and 21B show cutting current waveforms when perforations are successively formed through a metal plate having a thickness of 20 mm with a drill having a diameter of 20 mm. In this case, the normal cutting current increases gradually. FIGS. 21A and 21B show waveforms 1, 140, 900, 1600 and 2300 until a wear judging level TWL is reached. Although the cutting performance degrades a little, after the 230th drilling operation, drilling was possible even when the wear judging level has exceeded.

Although in the foregoing description, the value of the cutting current of the tool was detected by certain type of the torque detecting system in which the armature current of the motor for driving the spindle was detected through a shunt, it is also possible to use a thrust detecting system. In this case, a pressure sensitive element is embedded in the bearing member of the spindle and an output signal of the pressure sensitive element is passed through an analogue-digital converter. According to another method, the armature current of a motor for feeding the tool in the Z direction (the axial direction of the spindle.) is used, and according to still another method a servo-lag is used.

Figure 22:
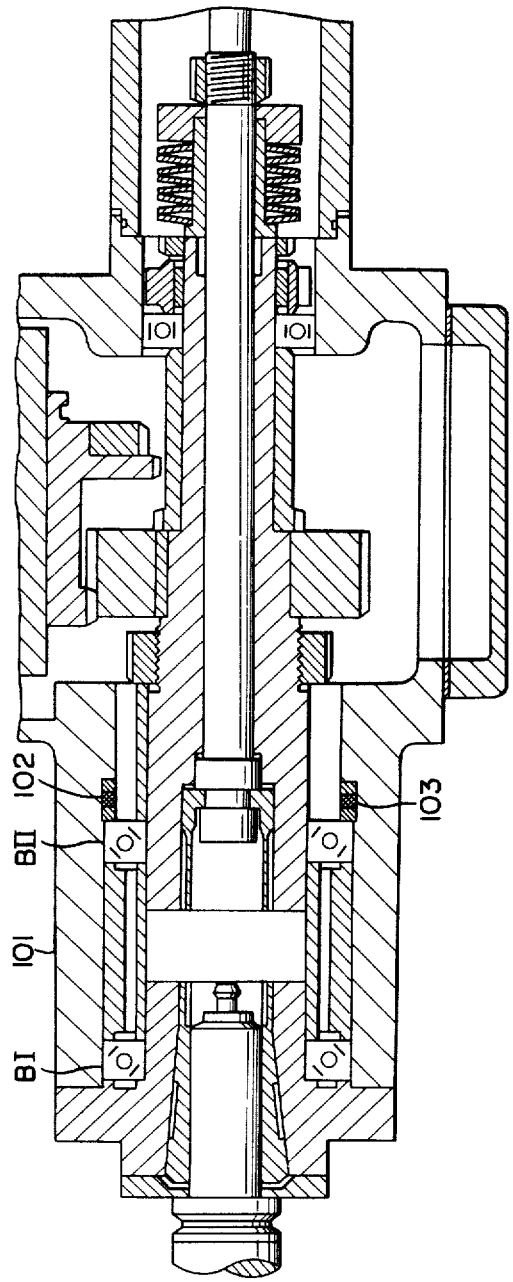
FIG. 22 is a longitudinal sectional view showing a thrust detecting pressure sensitive element embedded near the bearing of the spindle.

FIG. 22 shows the use of a pressure sensitive element. Thus, a member 103 embedding a pressure sensitive element 102 is abutted under a suitable preload against one end of the outer race of the bearing assembly BII received in a sleeve 101 for supporting the spindle. The output of the pressure sensitive element 102 is amplified and then converted into a digital quantity which is used as iNETNN and Ii in the flow charts shown in FIGS. 9, 10 and 11.

Figure 23:
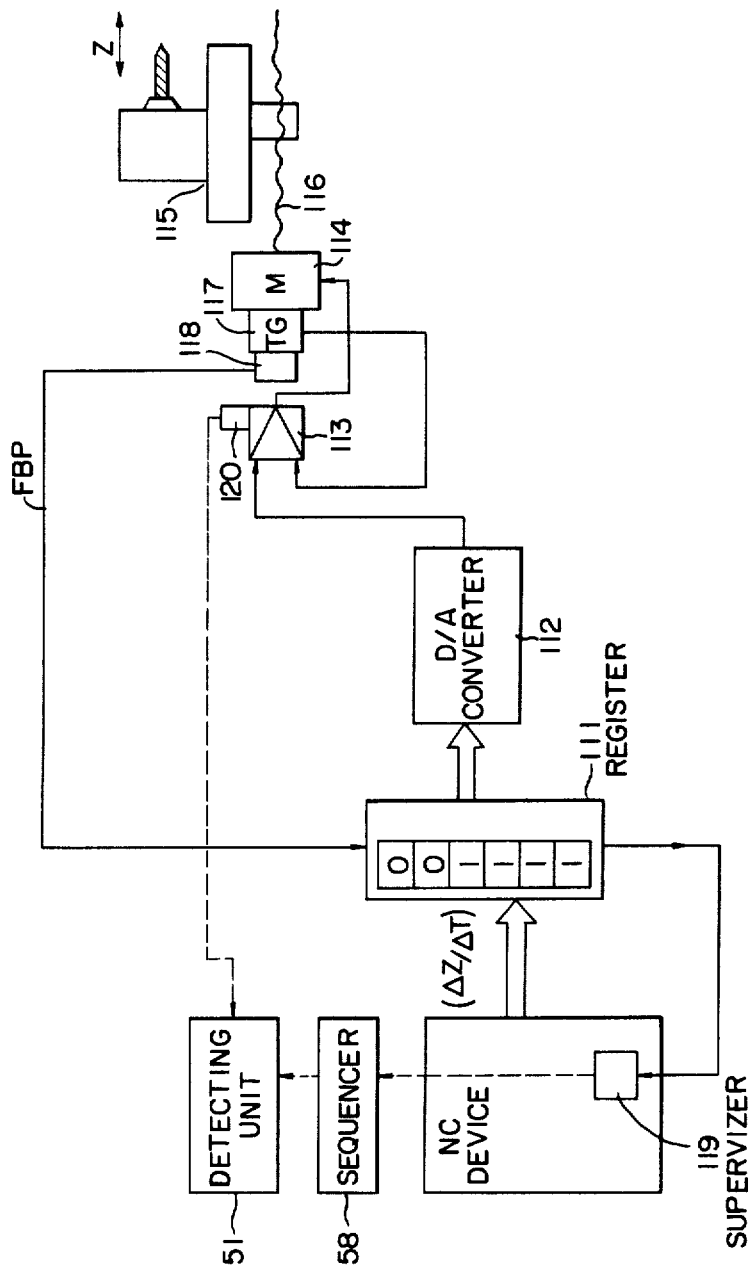
FIG. 23 is a block diagram showing a circuit in which the thrust force is detected by a servo-lag.

FIG. 23 shows a feed drive system in the Z axis direction of a machining center MC and is useful to explain the servo-lag method and the method of utilizing the armature current of the Z axis feed motor. As shown, an NC device applies a motion instruction ΔZ to a register 111 with an interval of ΔT. In this case, the register 111 has 6 bit capacity and ΔZ=001111 that it has a value of 15 times of the unit movement. This value is applied to a servo-amplifier 113 through a digital-analogue converter 112. Consequently, a servomotor 114 energized by the output of the servo-amplifier 113 moves a load 115 including a spindle in the Z axis direction by rotating a feed screw 116 (a direction instruction is not shown). A rotary encoder 118 is mounted on the feed screw 116 and the output of the rotary encoder 118 is supplied to the register 111 to act as a feedback pulse FBP to decrease the count of the register 111. For the purpose of stabilizing the operation of the servo-motor 114, the output of a tachometer generator 117 is fed back to the servo-amplifier 113. The count of the register 111 would not overflow when accumulating the instruction ΔZ because although ΔZ is applied at an interval of ΔT, the count of the register 111 is constantly decreased by the feedback pulse FBP. The count of the register 111 is termed servo-lag and constantly supervised by a supervisor 119 in the NC device to adjust the interval ΔT so as to prevent the overflow of the register 111. As shown, the servo-lag is applied to the sequencer 58 and thence to the detecting unit 51. To improve the sensitivity of the detection of such system utilizing the servo-lag it is necessary to set to suitable values the gain of a control loop comprising servo-amplifier 113, servo-motor 114, tachometer generator 117 and servo-amplifier 113, and of a control loop comprising servo-amplifier, servo-motor 114, rotary encoder 118, register 111, D/A converter 112 and servo-amplifier 113. With this servo-lag system, it is not necessary to use such special detecting circuit and an analogue-digital converter as disclosed in FIG. 7. Moreover, since digitallized signal is used, the system can operate satisfactorily.

In the system shown in FIG. 23, a shunt current detector 120 is used for detecting the armature current of the Z axis servo-motor 114 and the output of the shunt current detector 120 is supplied to the detecting unit 51. The program proceeds just in the same manner as in FIGS. 9 through FIG. 17 except that detected current is the armature current of the Z axis feed motor.

Although the invention has been shown and described in terms of a specific embodiment, the invention can be modified as follows.

1. In the illustrated embodiment, although the armature current of the motor for driving the spindle is sampled at the time of cutting and the mean value of the sampled values is used, it is possible to use a waveform pattern of the armature current over a definite time or to use the quantum value of the oscillation waveform of the spindle.

2. In this invention, tool break is principally taken up for the reason that the wear of a tool will finally result in the break. Accordingly, in the flow charts shown in FIGS. 9 through FIG. 17, both the wear judgement and the break judgement are included, but it will be clear that the routine relating to the wear judgement is not always essential.

3. In this invention, where the tool magazine of a machining center contains a sufficient number of substitute tools it is not necessary to provide means for supplementing the same.

4. Instead of supplementing a specific tool a tool magazine as a whole can be exchanged.

5. In the illustrated embodiment, for the purpose of supplementing a tool to the tool magazine, an automatic tool exchanging device is provided for each machining center MC. More particularly, a pallet carrying supplement tools is mounted on a machining center MC for supplying the tools to the tool magazine via a table. However, it will be clear that the supplementary tools may be supplied directly to the tool magazine without the intervention of the table of the machining center.

6. Although in FIGS. 1 and 4, a control system is shown utilizing the central computer 41 associated with an NC device and transfer control device for each machining center, it should be understood that the central computer 41 is not always necessary. More particularly, the control system may be constructed such that the NC device for each machining center MC is provided with machining programs for various workpieces, that means is provided for identifying a pallet when it is mounted on the table of the machining center, and that in response to the operation of said identifying means, a machining program is made to correspond to the workpiece on the pallet.

7. Instead of mounting the pallet on a carriage as has been described in connection with the illustrated embodiment the pallet may run on a conveyor line.

8. As shown by steps 36, 37 and 38 shown in FIGS. 9, 10 and 11, a relationship $$K3 > IR2 > K2$$

was used to judge whether a normal cutting condition has occurred or not, but it is also possible to set the flag FCNST to "1" when the feed amount of the ONTC TOOL reaches a predetermined value after starting the cutting start judgement.

The invention has the following advantages.

I. While a machining center MC is machining a workpiece I, when a break of an ONTC TOOL is judged, machining of the workpiece I is interrupted immediately and the workpiece is removed from the machining area. Then a new workpiece II is mounted. Accordingly, it is possible to make simple the operation of the system than a prior art system in which the remaining machining of the workpiece I is continued after exchanging the broken tool with a new one. The workpieces I whose machining has been interrupted are stored at a predetermined position so that they can be machined readily.

II. According to this invention, a memory device is provided for storing bit data representing the states (FTBNN, FTWNN and FCOMNN) of respective tools stored in a tool magazine, a broken or worn out tool which has been judged so (FTBNN="1" or FTWNN="1") will not be mounted on the spindle even when it is designated by the program. As a consequence, the workpiece is always machined by a sound tool.

III. Since a tool magazine stores a plurality of tools which are liable to break, where a tool is judged broken, another sound tool of the same type can be rapidly substituted for the broken tool.

IV. Where all of the tools of the same type supplied from a tool magazine are judged broken, since means is provided for supplementing the tools of the same type, it is possible to continuously operate the system, thus improving its operating efficiency.

V. According to this invention, since a wear judgement is made in addition to a break judgment of the tool, the tool is possitively judged worn out before it is judged to be broken, and since such worn out tool would not be used further it is possible to decrease the chance of interrupting the machining of the workpiece.

VI. The data, for example iNETNN and IR4, utilized for judging a break can also be used for judging a wear so that it is not necessary to use any special detector and routine for judging the wear.

VII. According to this invention, such ratios as IR1, IR2, IR3 and IR4 are used to determine a cutting start and a normal cutting start in a routine for judging the break or wear of the tool, so that where the diameter of a drill, for example, varies variously it is not necessary to set the judging conditions for different diameters.

VIII. In the system of this invention, the wear judgement is made immediately after starting the normal cutting state and when the result of such judgement is NO, only the break judgement is made during the subsequent cutting operation. This is based on a consideration that the wear of the tool does not increase abruptly while machining an opening but it increases gradually. Accordingly, even when the cutting current increases beyond the wear judging level due to chips which do not wear the tool, the system operates such that the wear judgement of the tool is prevented and the wear judgement is made only for a tool actually worn out.

IX. In the system of this invention, when a tool is judged worn out, the feed speed of the tool is decreased thereby continuing the machining of the workpiece without interruption. The degree of decreasing the feed speed is made to increase each time a wear judgement is made. Thus, decrease in the cutting ability caused by wear is compensated for by the decrease in the feed speed of the tool, thus continuing the machining of the workpiece by a tool judged worn out until it is replaced by a new tool. In other words, even when a tool is judged worn out, it is still used continuously until it is judged broken, thus decreasing the chance of interruption of the machining.

X. Since the break judgement is made before the tool actually breaks, the chance of damaging the worked surface of the workpiece by the fragments of the broken tool can be decreased.

XI. According to this invention, a tool supplement is instructed before the number of the sound tools FTBNN=FTWNN="0" in the tool groups contained in the tool magazine reduces to zero so that there is no such disadvantage of displacing the workpiece to proceed the tool supplement sequence when there is no substitute tool remaining in the tool magazine when a tool belonging to that group is judged to be worn out and when a tool of the same group is designated as an ONTC TOOL for continuing the machining.

XII. Since a self-propelling carriage carrying a pallet is provided and since a workpiece and supplemental tools can also be mounted on the carriage, the transfer of the workpiece and the supplementary tools can be made readily.

TABLE 1

In the table NN represents the tool number.

| Symbol | Meaning of the Symbol | Corresponding Step |
|---|---|---|
| FTCNN | "1" is stored when iNETNN is set. | ST13 |
| FTBNN | "1" is stored when tool NN is judged broken, and cleared when it is exchanged with a substitute tool. | ST17-2 ST71 |
| FTWNN | becomes "1" when tool NN is judged worn out, and cleared when it is exchanged with a substitute tool. | ST18-2 |
| FCOMNN | when tool NN is of the same type, it is set to the same value. | ST76 |
| iNETNN | represents the actual cutting current value at normal state which is used as a reference. | ST13 ST45 |
| FBRK | "1" is stored when the tool breaks. | ST61 |
| FWEAR | "1" is stored when the tool wears. | ST60 |
| FiNET | "1" is stored when iNET is set. | ST48 |
| FCNST | "1" is stored when the normal cutting state is judged. | ST38 |
| FCST | "1" is stored when a cutting start is judged. | ST34 |
| FiNUL | "1" is stored when no load current value INUL is set. | ST31 |
| FNTCAL | "1" is stored when FTBNNs or FTWNNs of respective tools having FCOMNN of the same value and belonging to the same group of a tool magazine become "1", and when a substitute tool is requested. | ST68 |
| FWCHK | "1" is stored if wear is not judged when a wear judging step is passed once. | ST57-2 |
| iNET | iNETNN is read out (iNETNN → iNET). | ST45 |
| INUL | no load current value. | ST30 |
| ICST | used to judge cutting start. mean value of sampled cutting current value. | ST32 |

TABLE 1-continued

In the table NN represents the tool number.

| Symbol | Meaning of the Symbol | Corresponding Step |
|---|---|---|
| ICNST1 | used to judge normal cutting state. mean value of sampled cutting current value. | ST36 |
| ICNST2 | used to judge normal cutting state. measured immediately after ICNST1. | ST36 |
| IR1 | ratio ICST/INUL. | ST-32 |
| IR2 | ratio ICNST2/ICNST1. | ST-36 |
| IR3 | ratio iNET/INUL. | ST-40 |
| IR4 | ratio IV/INET. | ST-56 |
| IV | current value under actual normal cutting state. | ST56 |
| Ii | armature current measured by a shunt. | ST56 |
| CiX | "1" is stored when the speed of the spindle reaches 70% of a predetermined value. | ST29 ST50 |
| SSP1 | "1" is stored when STP becomes "1" and cleared 0.5 sec. after CiX has become "1" when the spindle is restarted to rotate and reaches normal speed. | ST51 ST55 |
| SSP2 | "1" is stored when STP becomes "1" and cleared when CiX becomes "1" after restarting the spindle. | ST52 |
| STP | spindle stops. | ST49 |
| ONTC | "1" is stored when tool NN is being mounted on the spindle. | ST5 |
| MO6 (completion) | "1" is stored when tool exchange has been completed. | ST7 ST21 |
| BRESET | referred to clear FBRK. | ST17-3 |
| WRESET | referred to clear FWEAR. | ST18-3 |
| RESEC | represents reset of NC. When this signal appears, all flags and data in the detecting unit except FTCNN - FCOMNN and iNETNN in the detecting unit are cleared. | ST19 |
| SETFiN | "1" is stored when "1" is stored for FTCNN regarding a tool NN. | ST14 ST16 |
| TNEW | represents tools belonging FCOMNN of the tool magazine and sequentially designated. | ST76 |
| SPTREG | represents a register in which the code of a tool (tool NN) is temporarily stored when a tool selection instruction is given. | ST73 |
| TBR | represents a tool buffer which designates a tool to be exchanged in response to the count (tool number) of register SPTREG. | ST81 |

We claim:
1. An automatic operating system of a machine tool having a spindle on which a tool is mounted for machining a workpiece mounted on a machining area of said machining tool in accordance with a numerically controlled machining program, said system comprising:
   tool storage means (MG1) containing a plurality of tools for use on said machine tool;
   means (72) for detecting a machining load while said workpiece is machined by a tool;
   memory means (73) including:
      a first memory having first and second memory areas corresponding to the tools contained in said tool storage means, said first memory area being adapted to store a first data which is referred to for judging a broken state of said tool on said spindle, and said second memory area being adapted to store a second data which represents that said tool has been judged to be broken in accordance with said first data; and a second memory in which a third data is stored representing a machining load detected by said detecting means after machining operation has changed to an actual normal cutting state, said third data being compared with said first data during said actual normal cutting state;

means (74) for reading out said first and third data from said first and second memories respectively and then comparing said read out data with each other to judge that said tool has been broken, and then storing said second data into said second memory area of said first memory corresponding to said tool when the judgement of the broken state has been made;

means (75) responsive to the judgement of the broken state of said tool for interrupting the machining of said workpiece by said tool;

means (77) for moving said spindle relative to said workpiece to separate said tool therefrom;

means (79) for removing said workpiece out of said machining area;

means (81) for mounting another workpiece on said machining area;

means (83) for selecting a machining program corresponding to said another workpiece;

means (82) for selecting a tool out of said tool storage means for exchanging the selected tool with said tool judged to be broken; and means (84) for starting machining operation of said another operation with said selected tool.

2. The automatic operating system according to claim 1, which further comprises another memory means (73A) in which said first data has previously been stored, said first data being transferred to said first memory area of said first memory before starting the automatic machining operation.

3. The automatic operating system according to claim 1, wherein said tool storage means contains a group of tools including a plurality of tools of the same type which are substituted for said tool when it is judged to be broken, wherein said first memory further comprises another memory adapted to store another data for identifying respective tools of said tool group, and wherein said system further comprises means (80) for designating one of the tools belonging to said tool group whose second data is not yet stored in said second memory area as a substitute for the tool now being mounted on said spindle.

4. The automatic operating system according to claim 1, wherein said detecting means comprises means (93) for detecting a value of current of a motor (91) (60) for driving said spindle, said detected value being set into said memory as said third data.

5. The automatic operating system according to claim 1, wherein said detecting means comprises a thrust force detector (103) mounted on said spindle for detecting a thrust force acting upon said tool while it is operated, said thrust force being set into said second memory as said third data.

6. The automatic operating system according to claim 1, wherein said detecting means comprises a numerical control device (NC), a register (111) supplied from said numerical control device a motion instruction $\Delta Z$ with an interval of $\Delta T$, a servoamplifier (113) supplied with an output of said register for operating a spindle driving motor (114), a rotary encoder (118) rotated by said motor for applying a feedback pulse to said register for decreasing a count thereof, a supervisor (119) provided for said numerical control device, said supervisor being connected to respond to the count of said register to adjust said interval so as to prevent overflow of said register, and means (12) for detecting armature current of said motor.

7. The automatic operating system according to claim 1, which further comprises tool exchange means and wherein said tool storage means comprises a first tool storage section which stores tools to be mounted on said spindle by said tool exchange means, and tools judged broken and removed from said spindle by said tool exchange means, and a second tool storage section for storing usable tools to be supplied to said first tool storage section, and means responsive to a judgement of break of one of said tools contained in said first tool storage section for selecting a usable tool of the same type as said broken tool from said broken tools in said first tool storage section.

8. The automatic operating system according to claim 7, wherein said first tool storage section contains a group of a plurality of tools of the same type and said last mentioned means supplies usable tools of said type selected from said second tool storage section to said first tool storage section when all of the tools belonging to said group are judged broken.

9. The automatic operating system according to claim 8, which further comprises means for resetting said second memory area in which said second data has been stored when said usable tool selected from said second tool storage section has been supplied to said first tool storage section.

10. An automatic operating system of a machine tool having a spindle on which a tool is mounted for machining a workpiece mounted on a machining area of said machine tool in accordance with a numerically controlled machining program, said system comprising:

tool storage means containing a plurality of tools for use on said machine tool;

means for detecting a machining load while said tool is mounted on the machine tool for machining said workpiece;

memory means including:

a first memory having first, second and third memory areas corresponding to the tools contained in said tool storage means, said first memory area being adapted to store a first data which is referred to for judging a broken state of said tool mounted on said spindle, said second memory area being adapted to store a second data which represents that said tool has been judged to be broken in accordance with said first data, and said third memory area being adapted to store a fourth data which represents that said tool has been judged to be worn out in accordance with said first data, a second memory in which is stored a third data representing the machining load detected by said detecting means after the machining operation has been changed to a state of an actual normal machining state, said third data being compared with said first data for judging that said tool has been worn out or broken during said actual normal machining operation, means for reading out said first and third data from said first and second memories repsectively and then comparing said read out data with each other to judge that said tool has been worn out, and then storing said fourth data into said tool when it is judged to be worn out;

means (76) responsive to the judgement of the worn out tool for decreasing a feed rate of said tool;

means for reading out said first and third data from said first and second memory respectively and then comparing said read out data with each other to judge that said tool has been broken, and then storing said second data into said second memory area of said first memory corresponding to said tool when the judgement of the broken state of said tool has been made;

means (75) responsive to the judgement of the broken state of said tool for interrupting the machining of said workpiece by said tool;

means (77) for moving said spindle relative to said workpiece to separate said tool therefrom;

means (79) for removing said workpiece out of said machining area;

means (81) for mounting another workpiece on said machining area;

means (83) for selecting a machining program corresponding to said another workpiece;

means (82) for selecting a tool out of said tool storage means for exchanging the selected tool with said tool judged to be broken; and means (84) for starting the machining operation of said another workpiece with said another tool.

11. The automatic operating system according to claim 10, wherein said tool storage means contains a group of tools comprising a plurality of tools of the same type which are used to substitute for said tool when it is judged to be broken, wherein said first memory further comprises a fourth memory area adapted to store a fifth data for identifying respective tools of said group, and wherein said system further comprises means for designating one of the tools of said group whose second data is not yet stored in said fourth memory area as a substitute for a tool now being mounted on said spindle.

12. A method of automatic operation of a machine tool having a spindle on which a tool is mounted for machining a workpiece mounted on a machining area of said machine tool in accordance with a numerically controlled machining program, said machine tool being combined with tool storage means containing a plurality of tools for use on said machine tool, detecting means for detecting a machining load while said workpiece is being machined, and memory means including a first memory having first and second memory areas corresponding to the tools contained in said tool storage means; said method comprising the steps of:

detecting said machining load after a machining operation has changed to a state of actual normal machining state;

storing the detected machining load into said first area of said first memory as a first data which is referred to for judging the broken state of said tool on said spindle;

detecting said machine load during said actual normal machining state;

storing the detected machining load into said second memory as a third data which is compared with said first data during actual normal machining operation of said workpiece with said tool mounted on said spindle;

reading out said first and third data from said first memory areas of said first memory and said second memory respectively;

comparing said read out data with each other for judging a broken state of said tool;

storing a second data which represents that said tool has been broken into said second memory area of said first memory when said tool is judged to be broken as a result of said comparison;

interrupting the machining of said workpiece by said tool when it is judged to be broken;

moving said spindle relative to said workpiece to separate said tool therefrom;

removing said workpiece out of said machining area;

mounting another workpiece on said machining area;

selecting another machining program corresponding to said another workpiece;

selecting a usable tool out of said tool storage means and exchanging said usable tool with said tool judged to be broken; and machining said another workpiece with said usable tool.

13. The method according to claim 12, wherein said tool storage means containing a group of tools of the same type which are used to substitute said tool when it is judged to be broken, and said first memory including another memory area adapted to store another data for identifying one of the tools of said group, and wherein said method further comprising the step of designating one of the tools of said group whose second data is not yet stored in said second memory area of said first memory as a substitute for the tool now being mounted on said spindle when it is judged to be broken.

14. The method of automatic operation according to claim 12, which further comprises the step of storing said first data regarding tools which are used during an automatic operation in said first memory area before starting said automatic operation.

15. A method of automatic operation of a machine tool having a spindle on which a tool is mounted for machining a workpiece mounted on a machining area of said machine tool in accordance with a numerically controlled machining program, said machine tool being combined with tool storage means containing a plurality of tools for use on said machine tool, detecting means for detecting a machining load while said tool is machining said workpiece, and memory means including a first memory having first to third memory areas corresponding to the tools contained in said tool storage means and a second memory, said method comprising the steps of:

detecting said machining load after a machining operation has changed to a state of actual normal machining operation;

storing the detected machining load into said first memory area of said first memory as a first data which is referred to for judging a broken state of said tool on said spindle;

detecting said machining load during actual normal cutting state;

storing the detected machining load into said second memory as a third data which is compared with said first data during actual normal cutting operation of said workpiece with said tool mounted on said spindle;

reading out said first and third data from said first memory area of said first memory and said second memory respectively;

comparing said read out data with each other to judge that said tool has been worn out;

storing a fourth data which represents that said tool has been worn out into said third memory area of said first memory when said tool is judged to be worn out as a result of said comparison;

decreasing a feed rate of said tool when said tool is judged to be broken;

comparing said read out data with each other to judge that said tool has been broken;

storing a second data which represents that said tool has been broken into said second memory area of said first memory when said tool is judged to be broken as a result of immediately preceding comparison;

interrupting the machining of said workpiece by said tool when it is judged to be broken;

moving said spindle carrying said tool relative to said workpiece to separate the same away from said tool;

exchanging said workpiece with another workpiece;

selecting a machining program corresponding to said another workpiece;

selecting a usable tool out of said tool storage magazine and exchanging the selected tool with said tool judged to be broken; and machining said another workpiece with said usable tool.

* * * * *

UNITED STATES PATENT AND TRADEMARK OFFICE
CERTIFICATE OF CORRECTION

PATENT NO. : 4,249,243
DATED : Feb. 3, 1981
INVENTOR(S) : TETSU YOSHIDA; ISAO MORIMOTO

It is certified that error appears in the above—identified patent and that said Letters Patent is hereby corrected as shown below:

At [30] Foreign Application Priority Data, change "Feb. 11, 1977 [JP]   Japan............52/131848" to --Nov. 2, 1977 [JP]   Japan............52/131848--.

Signed and Sealed this

Ninth Day of June 1981

[SEAL]

Attest:

RENE D. TEGTMEYER

Attesting Officer                    Acting Commissioner of Patents and Trademarks